US010674556B2

(12) United States Patent
Li

(10) Patent No.: US 10,674,556 B2
(45) Date of Patent: Jun. 2, 2020

(54) METHOD FOR DATA TRANSMISSION AND MOBILE TERMINAL

(71) Applicant: Guangdong Oppo Mobile Telecommunications Corp., Ltd., Dongguan, Guangdong (CN)

(72) Inventor: Haiquan Li, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/021,841

(22) Filed: Jun. 28, 2018

(65) Prior Publication Data
US 2019/0007987 A1    Jan. 3, 2019

(30) Foreign Application Priority Data

Jul. 3, 2017    (CN) .......................... 2017 1 0533973

(51) Int. Cl.
*H04W 76/14* (2018.01)
*H04W 28/14* (2009.01)
(Continued)

(52) U.S. Cl.
CPC ......... *H04W 76/14* (2018.02); *H04L 67/2842* (2013.01); *H04L 67/2861* (2013.01);
(Continued)

(58) Field of Classification Search
CPC combination set(s) only.
See application file for complete search history.

(56) References Cited

U.S. PATENT DOCUMENTS

2009/0024754 A1*  1/2009  Setton ................. H04L 65/4084
                                                               709/231
2009/0249131 A1* 10/2009  Mitomo ................. H04M 3/51
                                                                714/48
(Continued)

FOREIGN PATENT DOCUMENTS

CN           1902619 A      1/2007
CN         101605138 A     12/2009
(Continued)

OTHER PUBLICATIONS

Extended European search report issued in corresponding European application No. 18181122.5 dated Aug. 28, 2018.
(Continued)

*Primary Examiner* — Yee F Lam
(74) *Attorney, Agent, or Firm* — Young Basile Hanlon & MacFarlane, P.C.

(57) ABSTRACT

A method and a related mobile terminal for data transmission include: establishing a direct communication connection to a second mobile terminal; transmitting first user data to the second mobile terminal through the direct communication connection; detecting the transmission status of first user data during the transmission of the first user data; accessing to a network-side storage device based on a determination that the transmission status detected is abnormal; sending a first storage request to the network-side storage device, wherein the first storage request includes second user data and the user identifier of the second mobile terminal, the second user data is a part of the first user data that is not transmitted to the second mobile terminal due to transmission abnormality.

14 Claims, 10 Drawing Sheets

(51) Int. Cl.
*H04W 76/15* (2018.01)
*H04W 76/18* (2018.01)
*H04W 8/20* (2009.01)
*H04W 40/22* (2009.01)
*H04W 88/18* (2009.01)
*H04W 4/80* (2018.01)
*H04L 29/08* (2006.01)

(52) U.S. Cl.
CPC ............ *H04W 8/20* (2013.01); *H04W 28/14* (2013.01); *H04W 40/22* (2013.01); *H04W 76/15* (2018.02); *H04W 76/18* (2018.02); *H04W 4/80* (2018.02); *H04W 88/182* (2013.01)

(56) References Cited

U.S. PATENT DOCUMENTS

| | | | | |
|---|---|---|---|---|
| 2011/0252238 | A1* | 10/2011 | Abuan | H04L 61/2575 |
| | | | | 713/168 |
| 2012/0110177 | A1* | 5/2012 | Malobrodsky | H04L 12/6418 |
| | | | | 709/225 |
| 2013/0246617 | A1 | 9/2013 | Zheng | |
| 2013/0297810 | A1* | 11/2013 | Ho | H04W 76/14 |
| | | | | 709/228 |
| 2014/0086256 | A1* | 3/2014 | Raniere | H04L 5/0001 |
| | | | | 370/401 |
| 2015/0022666 | A1* | 1/2015 | Kay | H04L 67/025 |
| | | | | 348/159 |
| 2015/0117340 | A1* | 4/2015 | Kawakami | H04W 76/14 |
| | | | | 370/329 |
| 2015/0230280 | A1* | 8/2015 | Dees | H04L 63/062 |
| | | | | 455/39 |
| 2015/0296042 | A1 | 10/2015 | Aoyama | |
| 2015/0312885 | A1 | 10/2015 | Pang | |
| 2017/0195386 | A1* | 7/2017 | Nathan | H04L 65/4084 |

FOREIGN PATENT DOCUMENTS

| | | |
|---|---|---|
| CN | 102468989 A | 5/2012 |
| CN | 102958066 A | 3/2013 |
| CN | 103533500 A | 1/2014 |
| CN | 103686585 A | 3/2014 |
| CN | 103701953 A | 4/2014 |
| CN | 104834617 A | 8/2015 |
| CN | 106790639 A | 5/2017 |
| WO | 03026138 A2 | 3/2003 |
| WO | 2016041112 A1 | 3/2016 |

OTHER PUBLICATIONS

International search report issued in corresponding international application No. PCT/CN2018/094075 dated Sep. 21, 2018.

* cited by examiner

METHOD FOR DATA TRANSMISSION AND MOBILE TERMINAL

CROSS-REFERENCE TO RELATED APPLICATION(S)

This application claims priority to Chinese Patent Application No. 201710533973.5, filed on Jul. 3, 2017, the content of which is hereby incorporated by reference in its entirety.

TECHNICAL FIELD

The present disclosure relates to the field of computer application technologies, and more particularly relates to a method for data transmission and a mobile terminal.

BACKGROUND

Data transmission between terminals refers to: when data is transmitted between two or more terminals, the data may be subjected to various processing by a certain transmission protocol, such as format processing, packing or unpacking, and then the processed data is transmitted from a source terminal to a target terminal through one or more established transmission links. There are many kinds of ways to transmit data, for example, the terminals may transmit data through a network connection and instant messaging applications, and may also transmit data through Bluetooth®, infrared technology and so on. How to ensure that the data can be completely transmitted between two terminals during transmission process of various types of data becomes a hot issue in research.

SUMMARY

Implementations of the present disclosure provide a method for data transmission and a mobile terminal, to ensure that user data can be completely transmitted between terminals.

In a first aspect, an implementation of the present disclosure provides a method for data transmission using a first mobile terminal. The method includes: establishing a direct communication connection to a second mobile terminal; transmitting first user data to the second mobile terminal through the direct communication connection established; detecting the transmission status of the first user data, during the transmission of the first user data; accessing to a network-side storage device based on a determination that the transmission status detected is abnormal; and sending a first storage request to the network-side storage device, wherein the first storage request includes second user data and the user identifier of the second mobile terminal, wherein the second user data is a part of the first user data that is not transmitted to the second mobile terminal due to transmission abnormality.

In a second aspect, an implementation of the present disclosure provides another method for data transmission using a second mobile terminal. The method includes: establishing a direct communication connection to a first mobile terminal; receiving first user data from the first mobile terminal through the direct communication connection established; detecting the transmission status of the first user data, during the transmission of the first user data; sending a download request to the network-side storage device, based on a determination that the transmission status detected of the first user data is abnormal, wherein the download request includes user identifier of the second mobile terminal; receiving second user data from the network-side storage device, wherein the second user data is a part of the first user data that is not transmitted due to transmission abnormality.

In a third aspect, an implementation of the present disclosure provides a mobile terminal. The mobile terminal includes a memory configured to store computer-readable program codes; a processor configured to invoke the computer-readable program codes to execute: establishing a direct communication connection to a second mobile terminal; transmitting first user data to the second mobile terminal through the direct communication connection established; detecting the transmission status of the first user data, during the transmission of the first user data; accessing to a network-side storage device based on a determination that the transmission status detected is abnormal; and sending a first storage request to the network-side storage device, wherein the first storage request includes user identifier of the second mobile terminal and second user data, wherein the second user data is a part of the first user data that is not transmitted to the second mobile terminal due to transmission abnormality.

BRIEF DESCRIPTION OF THE DRAWINGS

To better illustrate the technical solutions of implementations of the present disclosure, the following descriptions will briefly illustrate the accompanying drawings described in the implementations. Obviously, the following described accompanying drawings are some implementations of the present disclosure. Those skilled in the art can obtain other accompanying drawings according to the described accompanying drawings without creative efforts.

DETAILED DESCRIPTION

Figure 1:
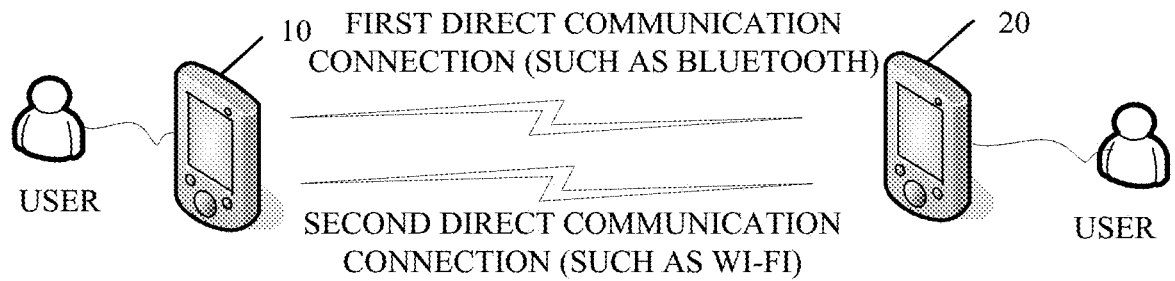
FIG. 1 is a schematic diagram of a network for transmitting data through a direct communication connection in accordance with an implementation of the present disclosure.

The technical solutions of implementations of the present disclosure will be described clearly and completely in combination with the accompanying drawings of the implementations of the present disclosure. Obviously, the described implementations are merely a part of implementations of the present disclosure, but not all of the implementations. All other implementations obtained by those skilled in the art without creative efforts based on the implementations of the present disclosure shall fall within the protection scope of the present disclosure.

Terms "first", "second", and "third", and so on used in the specification, claims and accompanying drawings of the present disclosure are used to distinguish different objects, rather than describe specific sequences. Additionally, term "comprising" and any deformation thereof are intended to cover non-exclusive inclusion. For example, processes, methods, systems, products, or devices including a series of steps or modules are not limited to listed steps or modules, but in at least one alternative implementation, may include steps or modules which are not listed, or in at least one alternative implementation, may further include other inherent steps or modules for these processes, methods, products, or devices.

The "implementation" mentioned herein means that particular features, structures, or characteristic described with reference to the implementations may be included in at least one implementation of the present disclosure. Phrases appearing at various positions of the specification neither always refer to the same implementation, nor separate or alternative implementations that are mutually exclusive with other implementations. It is explicitly and implicitly understood by those skilled in the art that the implementations described herein may be combined with other implementations.

It should be understood that, a first mobile terminal and a second mobile terminal described in the present disclosure may include, but are not limited to mobile terminals which have network connectivity and data transmission capability, such as a mobile phone, a tablet computer, and so on. The mobile terminals may also be referred to user equipment (UE), terminals, wireless terminals, mobile station (MS), and so on, which are not limited in the implementations of the present disclosure.

Obviously, during any communication process, at least two communication parties, namely the sender and the receiver of communication data, are included. It should be understood that, a direct communication connection in the implementations of the present disclosure supports bidirectional communication. Therefore, both of the communication parties can be acted as one of the sender and the receiver of communication data. In the implementations of the present disclosure, a sending terminal and a receiving terminal are respectively used to represent the sender and the receiver of communication data during any data transmission process. It should be understood that, both of the sending terminal and the receiving terminal described in the implementations of the present disclosure can be the mobile terminal described above. Therefore, the implementations of the present disclosure may be applied to a direct communication between mobile phones, or may be applied to a direct communication between a mobile phone and a tablet computer, and so on, which are not limited in the implementations of the present disclosure.

Two mobile terminals may transmit user data through a direct communication connection which is established by Wireless Fidelity (Wi-Fi) hotspot or other communication ways. If the distance between the two mobile terminals exceeds transmission distance range of the direct communication connection such as a Bluetooth connection and so on, due to the movements of one or two of the mobile terminals, or if signal interference is generated, and so on, the direct communication connection will be interrupted, and the user data transmission will thus be interrupted. At this time, the user may wait for the resume of the direct communication connection, or re-establish the direct communication connection, thereby continue transmitting a part of the user data that is not transmitted due to the interruption of the direct communication connection.

In the implementations of the present disclosure, when the above problems occur, the direct communication connection user data that is not transmitted due to transmission abnormality may be transmitted by a network-side storage device. In order to make the implementations be better understood, the following will first describe a schematic diagram of a network for transmitting data through a direct communication connection.

FIG. 1 is a schematic diagram of a network for transmitting data through a direct communication connection in accordance with an implementation of the present disclosure. As illustrated in FIG. 1, the network includes a first mobile terminal 10 and its associated user, and a second mobile terminal 20 and its associated user. A direct communication connection is established between the first mobile terminal 10 and the second mobile terminal 20. The first mobile terminal 10 and the second mobile terminal 20 may transmit user data through the direct communication connection established.

In the implementation of the present disclosure, the direct communication refers to the first mobile terminal 10 and the second mobile terminal 20 communicating with each other directly without the aid of a third-party device such as a base station (BS), a server, a wireless access point (WAP), and so on. For example, taking the first mobile terminal 10 as a sender, and taking the second mobile terminal 20 as a receiver, when the first mobile terminal 10 sends user data to the second mobile terminal 20 through the direct communication connection, the user data arrives directly from the first mobile terminal 10 to the second mobile terminal 20 without passing through any third-party device, that is, it is no need to use any third-party device to forward the user data.

In an implementation, the direct communication connection includes connection based on communication technologies such as Bluetooth, infrared, Wi-Fi, near field communication (NFC), and so on. It should be understood that, the direct communication connection may be established based on a request for direct communication connection initiated by any one of the first mobile 10 and the second mobile terminal 20.

In an implementation, the direct communication connection may include at least one of a first direct communication connection and a second direct communication connection. The first direct communication connection is different from the second direct communication connection, and the second direct communication connection may be established through the first direct communication connection.

Establishing a direct communication connection between the first mobile terminal 10 and the second mobile terminal 20 may specifically include at least one of: establishing a first direct communication connection between the first mobile terminal 10 and the second mobile terminal 20 based on a first transmission technology; and establishing a second direct communication connection between the first mobile terminal 10 and the second mobile terminal 20 based on a second transmission technology.

The first transmission technology may be the communication technologies such as Bluetooth, infrared, NFC and so on. In an implementation, any one of the first mobile terminal 10 and the second mobile terminal 20 can initiate a Bluetooth pairing request, in order to establish the first direct communication connection between the first mobile terminal 10 and the second mobile terminal 20.

The second transmission technology may be the communication technologies such as Wi-Fi hotspot, and so on, and any one of the first mobile terminal 10 and the second mobile terminal 20 may enable its Wi-Fi hotspot function, in order to establish the second direct communication connection between the first mobile terminal 10 and the second mobile terminal 20.

In an implementation, when establishing the second direct communication connection, the first mobile terminal 10 and the second mobile terminal 20 may exchange the connection data of the second transmission technology through the first direct communication connection established, and then establish the second direct communication connection based on the connection data and the second transmission technology. The connection data may be, for example, a user name and an access password of the Wi-Fi hotspot.

In an implementation, before establishing the second direct communication connection, the remaining power of the terminals may be considered first. If the remaining power is higher than a predetermined power-threshold, a Wi-Fi hotspot connection may be established between the first mobile terminal 10 and the second mobile terminal 20 directly based on Wi-Fi hotspot communication technology, in order to establish the second direct communication connection. If the remaining power is lower than the predetermined power-threshold, the first direct communication connection may be established first based on communication technologies such as Bluetooth, and so on, then the connection data of the second transmission technology may be exchanged through the first direct communication connection, and then the second direct communication connection may be established based on the connection data and the second transmission technology.

In an implementation, before establishing the second direct communication connection, the first mobile terminal 10 and the second mobile terminal 20 may obtain the connection data of the second transmission technology by scanning a two-dimensional code, and then establish the second direct communication connection based on the connection data and the second transmission technology.

The power consumption of terminals for data exchange through the first direct communication connection is lower than the power consumption of terminals for data exchange through the second direct communication connection. Moreover, the power consumption of terminals for other data exchange through the first direct communication connection is lower than the power consumption for the exchange of the connection data of the second transmission technology between the first mobile terminal 10 and the second mobile terminal 20 through the first direct communication connection.

In an implementation, a direct communication button may be set on each one of the first mobile terminal 10 and the second mobile terminal 20. When user presses the direct communication buttons set on the first mobile terminal 10 and the second mobile terminal 20 to enable the direct communication function, both of the first mobile terminal 10 and the second mobile terminal 20 may automatically enable the function module of the terminals configured to establish the first direct communication connection, such as Bluetooth module, NFC module and so on, and then enable the Wi-Fi hotspot function or Wi-Fi scanning function, in order to establish the second direct communication connection based on the Wi-Fi hotspot technology.

For example, taking the first mobile terminal 10 a sender, the first mobile terminal 10 may transmit first user data to the second mobile terminal 20 through the direct communication connection established.

During the transmission of the first user data, the first mobile terminal 10 continuously detects the transmission status of the first user data. The transmission status includes a normal status and an abnormal status. The causes of the transmission status of the user data to be an abnormal status, that is, the causes of the transmission abnormality or the transmission interruption may include that: the movements of the first mobile terminal 10 and/or the second mobile terminal 20 result in the distance between the first mobile terminal 10 and the second mobile terminal 20 exceeding transmittable distance of the direct communication connection; or the associated user of the first mobile terminal 10 and/or the associated user of the second mobile terminal 20 have left the current transmission location, which causes the first user data cannot be further transmitted between the first mobile terminal 10 and the second mobile terminal 20 through the direct communication connection; or significant external interference and so on.

Figure 2:
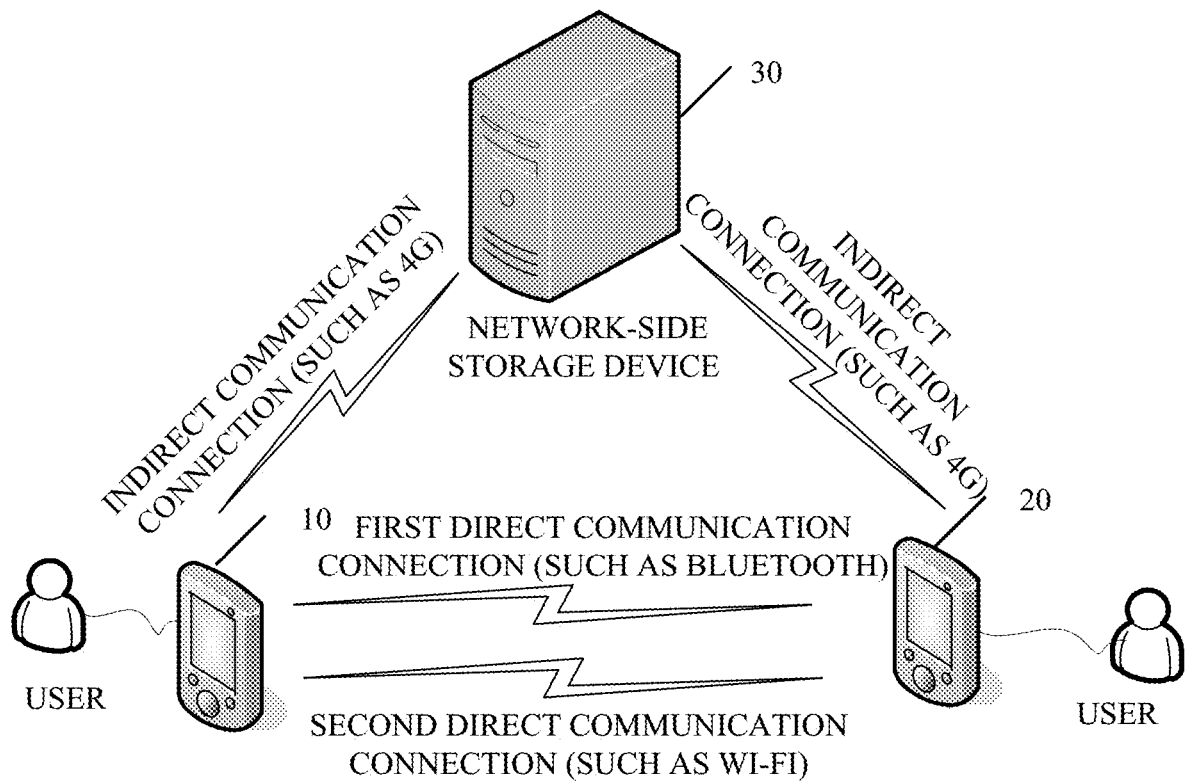
FIG. 2 is a schematic diagram of a network for transmitting direct communication connection user data with the aid of a network-side storage device in accordance with an implementation of the present disclosure.

In an implementation, if the transmission status detected of the first user data is abnormal, and the abnormal status does not return to a normal status during a predetermined time period, the first mobile terminal 10 may package, into a first storage request, the user identifier of the second mobile terminal 20 and second user data that is not transmitted to the second mobile terminal 20 due to transmission abnormality, and send the first storage request to a network-side storage device 30 (as illustrated in FIG. 2) through a network connection such as the fourth generation of mobile telecommunications technology (4G) and so on, which is established between the first mobile terminal 10 and the network-side storage device 30, in order to store the second user data in the network-side storage device 30.

In another implementation, according to the causes of the transmission abnormality, if the movements of the first mobile terminal 10 and/or the second mobile terminal 20 make the distance between the first mobile terminal 10 and the second mobile terminal 20 less than the transmittable distance of the direct communication connection, or the external interference is reduced and so on, the transmission status of the first user data may return to a normal status, namely the second user data may be further transmitted through the direct communication connection.

After receiving the second user data that is not transmitted to the second mobile terminal 20 due to transmission abnormality, the network-side storage device 30 stores the received second user data. In an implementation, the network-side storage device 30 further associates and stores the user identifier of the second mobile terminal 20 and the second user data. When the second mobile terminal 20 is detected to access to the network-side storage device 30, the network-side storage device 30 may send, to the second mobile terminal 20, a prompt message for inquiring whether to download data.

After receiving the prompt message from the network-side storage device 30, if the second mobile terminal 20 needs to download the second user data stored in the network-side storage device 30, the second mobile terminal 20 may send a download request to the network-side storage device 30. Alternatively, if the second mobile terminal 20 does not need to download the second user data stored in the network-side storage device 30, the second mobile terminal 20 may send a download rejection message to the network-side storage device 30.

After receiving the download request from the second mobile terminal 20, the network-side storage device 30 may send, to the second mobile terminal 20, the stored second user data that is not transmitted to the second mobile terminal 20 due to transmission abnormality. After the second user data being completely sent to the second mobile terminal 20, the network-side storage device 30 may delete the stored second user data. The network-side storage device 30 may also delete the stored second user data if the network-side storage device 30 receives the download rejection message from the second mobile terminal 20.

In an implementation, when the first mobile terminal 10 cannot continue to transmit the user data to the second mobile terminal 20, caused by the associated user of the first mobile terminal 10 and/or the associated user of the second mobile terminal 20 leaving their current transmission location, if the first mobile terminal 10 still needs to transmit third user data to the second mobile terminal 20, then the first mobile terminal 10 may package the user identifier of the second mobile terminal 20 and the third user data into a second storage request, and send the second storage request to the network-side storage device 30 through an established network connection, in order to store the third user data in the network-side storage device 30. In an implementation, the network-side storage device 30 associates and stores the user identifier of the second mobile terminal 20 and the third user data.

In an implementation, after receiving the download request from the second mobile terminal 20, the network-side storage device 30 may send both of the stored second user data and third user data associated with the second mobile terminal 20 to the second mobile terminal 20.

In an implementation, the second storage request may further include data identifier of the third user data, and the network-side storage device 30 may continue to associate and store the third user data and the data identifier of the third user data, after sending the third user data to the second mobile terminal 20. When the first mobile terminal 10 needs to transmit the third user data to a third mobile terminal through the network-side storage device 30, the first mobile terminal 10 does not need to upload the third user data again, but only needs to send the user identifier of the third mobile terminal and the data identifier of the third user data to the network-side storage device 30, in order to make the network-side storage device 30 to send the third user data to the third mobile terminal according to the data identifier of the third user data.

In an implementation, the network-side storage device 30 may associate and store the user identifier of the third mobile terminal and the data identifier of the third user data. After receiving the download request from the third mobile terminal, the network-side storage device 30 may search out the stored data identifier of the third user data associated with user identifier of the third mobile terminal, according to the user identifier of the third mobile terminal included in the download request, then search out the stored third user data associated with the data identifier of the third user data, and then send the third user data to the third mobile terminal.

Therefore, in the implementations of the present disclosure, the direct communication connection user data that is not transmitted due to transmission abnormality can be transmitted by the network-side storage device, to improve the success probability of the transmission of the direct communication connection user data. Correspondingly, the implementations of the present disclosure further disclose a device for data transmission and a mobile terminal. The method and the device for data transmission and the mobile terminal disclosed in the implementations of the present disclosure will be respectively described in detail below in combination with the accompanying FIGS. 3 to 16.

The present disclosure relates to a method for data transmission using a first mobile terminal. The method includes the follows: establishing a direct communication connection to a second mobile terminal; transmitting first user data to the second mobile terminal through the direct communication connection established; detecting the transmission status of the first user data, during the transmission of the first user data; accessing to a network-side storage device based on a determination that the transmission status detected is abnormal; and sending a first storage request to the network-side storage device. The first storage request includes second user data and the user identifier of the second mobile terminal, and the second user data is a part of the first user data that is not transmitted to the second mobile terminal due to transmission abnormality.

Figure 3:
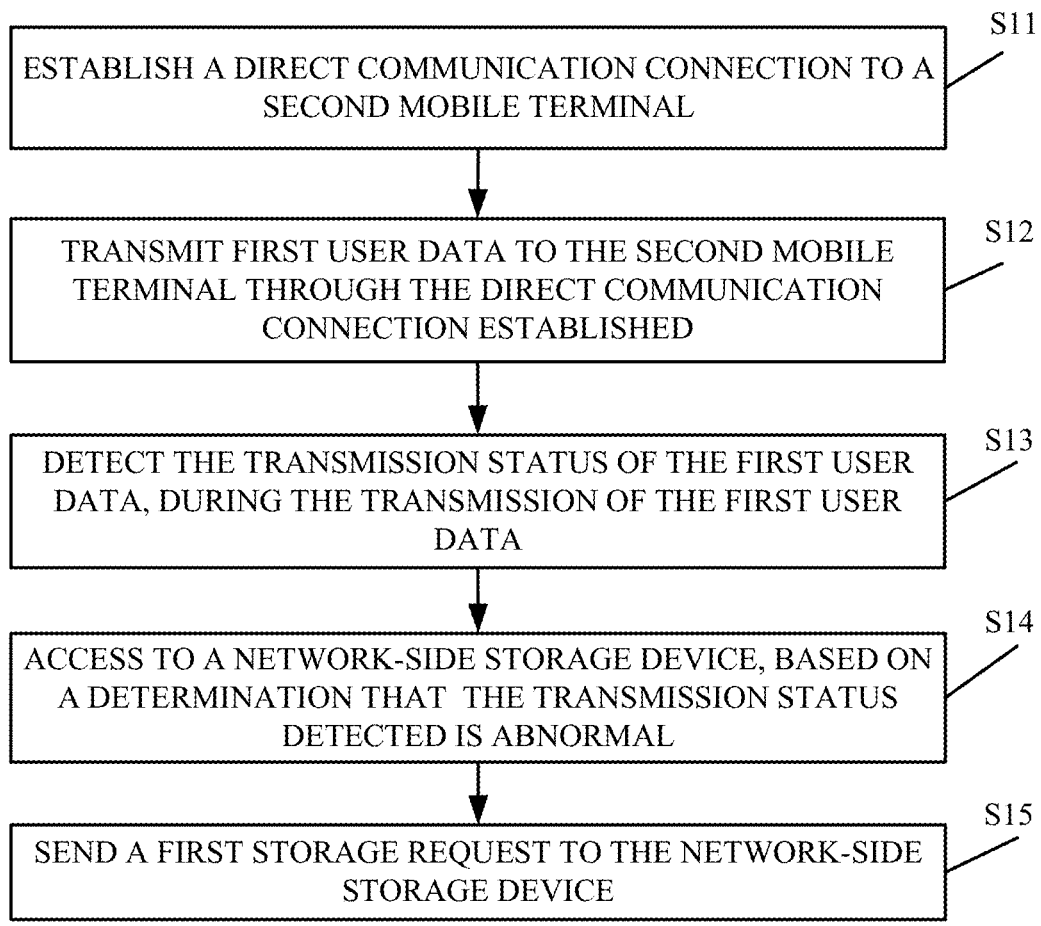
FIG. 3 is a flow chart of a method for data transmission in accordance with an implementation of the present disclosure.

FIG. 3 is a flow chart of a method for data transmission provided in an implementation of the present disclosure. Specifically, the method may be performed by a first mobile terminal. The method of data transmission in the implementation of the present disclosure may include operations at blocks illustrated in FIG. 3.

At block S11, a direct communication connection to a second mobile terminal is established.

In the implementations of the present disclosure, the direct communication connection may be communication connection based on communication technologies such as Bluetooth, infrared, NFC, Wi-Fi Peer-to-Peer (P2P) connection and so on.

In an implementation, the first mobile terminal may directly interact with the second mobile terminal to establish the direct communication connection, and interaction data is transmitted only between the first mobile terminal and the second mobile terminal. Bluetooth technology uses this implementation. With such implementation, the first mobile terminal and the second mobile terminal may establish the direct communication connection without accessing to network, but the direct communication connection established has a weak anti-interference ability. If the direct communication connection is failed, it can be re-connected. When the times for re-connecting the direct communication connection reach a predetermined number of times, a prompt message of connection failure may be output, to remind the user that the connection failure and/or to retry later.

In an implementation, the first mobile terminal may establish the direct communication connection with the second mobile terminal with the aid of a network-side communication device. When the first mobile terminal detects that a direct communication connection function of the first mobile terminal is switched from a disable state to an enable state, and the first mobile terminal is connected to a network-side communication device such as a macro eNB, a home eNB and so on, the first mobile terminal sends a direct communication connection request to the network-side communication device. The direct communication connection request may include the user identifier of the first mobile terminal, and the user identifier of a target object of the direct communication connection to which the first mobile terminal need to communicate, namely the user identifier of the second mobile terminal. The network-side communication device obtains location information of the first mobile terminal and the second mobile terminal, according to the user identities of the first mobile terminal and the second mobile terminal. Then the network-side communication device determines the distance between the first mobile terminal and the second mobile terminal, according to the obtained location information. And then the network-side communication device determines whether the distance is less than the transmittable distance of the direct communication connection, according to the determined distance. If the distance is less than the transmittable distance of the direct communication connection, the network-side communication device sends a request confirmation message to the first mobile terminal. The request confirmation message may include the available frequency spectrum allocated by the network-side communication device to the first mobile terminal. After receiving the request confirmation message from the network-side communication device, the first mobile terminal may interact with the second mobile terminal to establish the direct communication connection. After the direct communication connection is established successfully, the first mobile terminal and the second mobile terminal may perform data transmission on the available frequency spectrum allocated by the network-side communication device. If the first mobile terminal does not receive the request confirmation message sent from the network-side communication device, the first mobile terminal may resend the direct communication connection request. If the times for re-sending the direct communication connection request reach a predetermined number of times, the first mobile terminal may directly interact with the second mobile terminal, without the aid of the network-side communication device, to establish the direct communication connection.

At block S12, first user data is transmitted to the second mobile terminal through the direct communication connection established.

At block S13, the transmission status of the first user data is detected, during the transmission of the first user data.

During a process that the first mobile terminal sends the first user data such as image, audio, video, document and so on, to the second mobile terminal through the direct communication connection established, the first mobile terminal continuously detects the transmission status of the first user data transmitted through the corresponding direct communication connection. The transmission status of the first user data includes a normal status and an abnormal status. In an implementation, the causes of the transmission status of the first user data to be an abnormal status, that is, the causes of the transmission abnormality or the transmission interruption may include that: the movements of the first mobile terminal and/or the second mobile terminal result in the distance between the first mobile terminal and the second mobile terminal exceeding transmittable distance of the direct communication connection; or the associated user of the first mobile terminal and/or the associated user of the second mobile terminal have left the current transmission location, which causes the first user data cannot be further transmitted between the first mobile terminal and the second mobile terminal through the direct communication connection; or significant external interference and so on.

At block S14, the first mobile terminal accesses to a network-side storage device, based on a determination that the transmission status detected is abnormal.

The network-side storage device may be, for example, a cloud server and so on. In an implementation, based on a determination that the transmission status detected is abnormal, the method may further include: detecting the transmission status of the first user data during a predetermined time period; accessing to the network-side storage device, if the transmission status of the first user data is still abnormal after the predetermined time period; if the transmission status of the first user data is switched to a normal status from the abnormal status within the predetermined time period, transmitting, through the direct communication connection established, a part of the first user data that is not transmitted to the second mobile terminal due to transmission abnormality.

At block S15, a first storage request is sent to the network-side storage device.

The first storage request may include a part of the first user data that is not transmitted to the second mobile terminal due to transmission abnormality, namely second user data, and the user identifier of the second mobile terminal. The first mobile terminal sends the first storage request to the network-side storage device, to enable the network-side storage device to associate and store the user identifier of the second mobile terminal and the second user data included in the first storage request. Therefore, the network-side storage device may search out the second user data associated with the user identifier of the second mobile terminal, when the second mobile terminal accesses to the network-side storage device, and then sends the second user data to the second mobile terminal.

In an implementation, the described user identifier is configured to uniquely identify the recipient of the data transmitted through the direct communication connection. The user identifier of the second mobile terminal may be a device identity (such as a physical address) of the second mobile terminal, or information such as a user account which is used when the second mobile terminal accesses the network-side storage device and used to uniquely identify the second mobile terminal or the associated user of the second mobile terminal and so on, or a specific identity which is agreed between the first mobile terminal and the second mobile terminal and used to uniquely identify the second mobile terminal or the associated user of the second mobile terminal.

In the implementations of the present disclosure, during the data transmission from the first mobile terminal to the second mobile terminal through the direct communication connection established, when the first user data transmission is in an abnormal status, the first mobile terminal sends, to the network-side storage device, a part of the first user data that is not transmitted to the second mobile terminal due to transmission abnormality, thereby transferring the direct communication connection user data that is not transmitted due to transmission abnormality with the aid of the network-side storage device.

Figure 4:
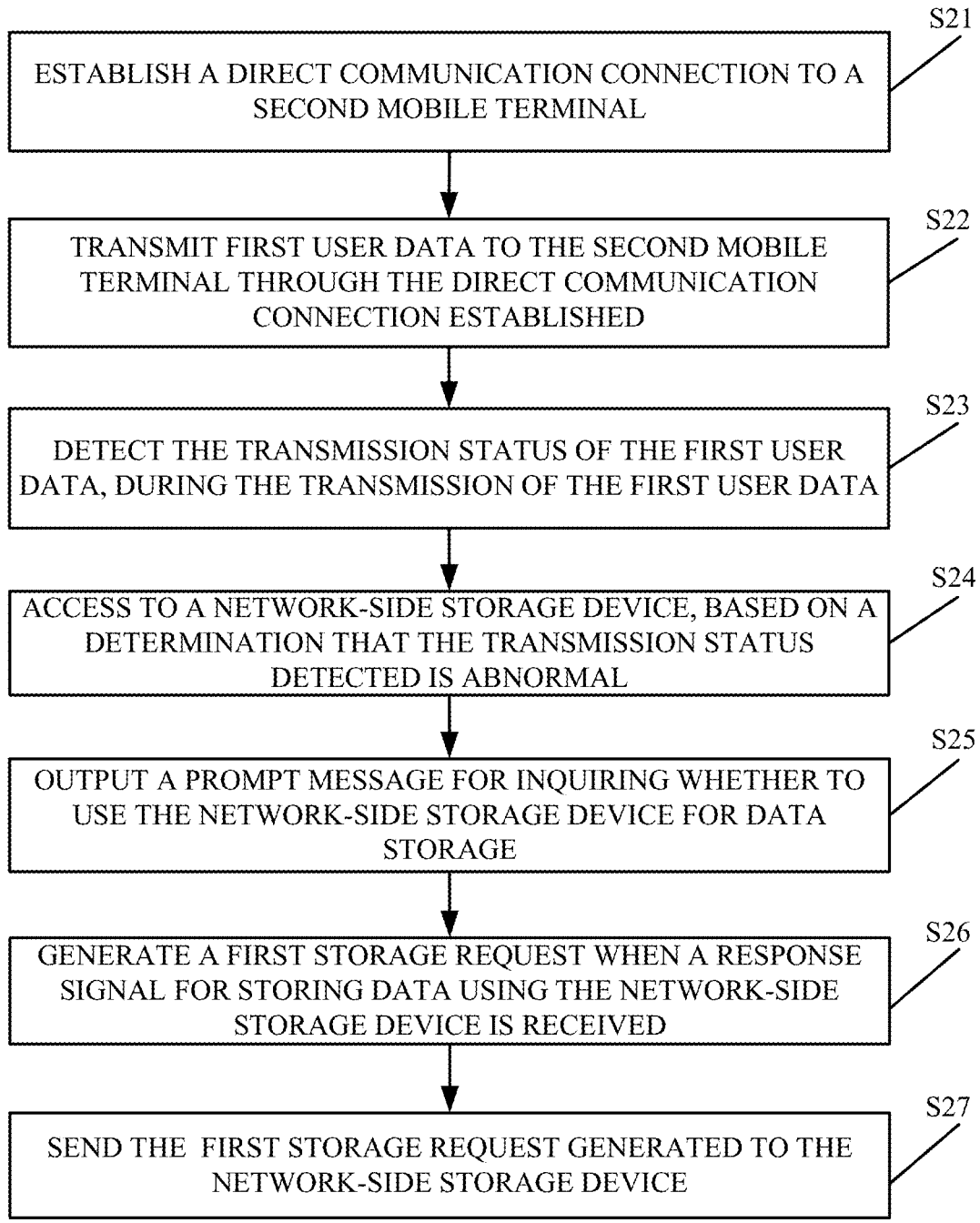
FIG. 4 is a flow chart of another method for data transmission in accordance with an implementation of the present disclosure.

Further, FIG. 4 is a flow chart of another method for data transmission provided in an implementation of the present disclosure. Specifically, the method may be performed by a first mobile terminal. The method of data transmission in the implementation of the present disclosure may include operations at blocks illustrated in FIG. 4.

At block S21, a direct communication connection to a second mobile terminal is established.

At block S22, first user data is transmitted to the second mobile terminal through the direct communication connection established.

At block S23, the transmission status of the first user data is detected, during the transmission of the first user data.

At block S24, the first mobile terminal accesses to a network-side storage device, based on a determination that the transmission status detected is abnormal.

Specifically, specific technical details of block S21 to S24 of the implementation of the present disclosure may respectively refer to the related technical details of block S11 to S14 of the implementation of the present disclosure with reference to FIG. 3.

In an implementation, the first mobile terminal accesses to a network-side storage device, based on a determination that the transmission status detected is abnormal as described above, may specifically include: detecting whether the first mobile terminal is connected to a network, based on a determination that the transmission status detected is abnormal; controlling the first mobile terminal to access to a network-side storage device, when the first mobile terminal has already been connected to the network; and enabling a network connection function to connect the first mobile terminal to a network when the first mobile terminal is unconnected to the network, and controlling the first mobile terminal to access a network-side storage device based on the connected network. In an implementation, controlling the first mobile terminal to access to a network-side storage device, may specifically include: obtaining the user information of the user of the first mobile terminal for network storage; logging in to a network-side storage device according to the user information obtained, after the first mobile terminal being connected to the network. The network described above refers to indirect connect communication networks such as cellular mobile communications network, such as 4G network and so on. In the implementation of the present disclosure, the indirect connect communication refers that the aid of network-side communication devices such as a base station and so on, is required to perform the communication connection between two terminals, and the indirect connect communication is concept be relative to the direct-connect communication.

In an implementation, connecting the first mobile terminal to the network, may specifically include: detecting the network to which the first mobile terminal is most frequently connected, and connecting the first mobile terminal to the most frequently connected network; or detecting the network to which the first mobile terminal is connected last time, and connecting the first mobile terminal to the last time connected network; or detecting connectable networks for the first mobile terminal, and connecting the first mobile terminal to one of the connectable networks which has the highest signal intensity. It should be understood that the first mobile terminal may also be connected to the network by another manner, which is not limited to the implementation of the present disclosure.

The user information used by the user for network storage may include login account information such as login username, login E-mail, Login phone number and so on, which is registered by the user in the network-side storage device, and a login password. The first mobile terminal may access to the network-side storage device according to the registered login account information and login password. In an implementation, the user information of the user for network storage may also include user's social account and associated password bounded to the network-side storage device. The first mobile terminal may access to the network-side storage device according to the bound social account and associated password.

At block S25, a prompt message is an output for inquiring whether to use the network-side storage device for data storage.

The first mobile terminal outputs the prompt message for inquiring whether to use the network-side storage device for data storage, to inquire the user whether to send the second user data that is not transmitted to the second mobile terminal due to transmission abnormality, to the network-side storage device for storage. The output interface of the prompt message may include two menu options showing "yes" and "no".

At block S26, a first storage request is generated when a response signal for storing data using the network-side storage device is received.

In an implementation, the user selects the menu option showing "yes" on the output interface of the prompt message, a response signal for data storage using the network-side storage device can be received. In an implementation, the first mobile terminal may obtain the user identifier of the second mobile terminal, and package the obtained user identifier of the second mobile terminal into the first storage request. In an implementation, the first mobile terminal may further detect a part of the first user data that is not transmitted to the second mobile terminal due to transmission abnormality, that is second user data, and package the second user data into the first storage request. Therefore, the first storage request may include the second user data that is not transmitted to the second mobile terminal due to transmission abnormality, and the user identifier of the second mobile terminal.

At block S27, the first storage request generated is sent to the network-side storage device.

Specifically, specific technical details of block S27 of the implementation of the present disclosure may refer to the related technical details of block S15 of the implementation of the present disclosure with reference to FIG. 3.

In an implementation, when the first mobile terminal cannot further to transmit the user data to the second mobile terminal, caused by the associated user of the first mobile terminal and/or the associated user of the second mobile terminal leaving the current transmission location, if the first mobile terminal needs to transmit third user data to the second mobile terminal, then the first mobile terminal may send a second storage request to the network-side storage device through an established network connection. The third user data is different from the second user data, and the second storage request includes the user identifier of the second mobile terminal and the third user data, therefore the network-side storage device can associate and store the user identifier of the second mobile terminal and the third user data.

In an implementation, the second storage request may further include data identifier of the third user data. If the first mobile terminal needs to transmit the third user data to a third mobile terminal through the network-side storage device, the first mobile terminal does not need to upload the third user data again, but only needs to package the user identifier of the third mobile terminal and the data identifier of the third user data into a third storage request, and then send the third storage request to the network-side storage device through the network connection established, in order to make the network-side storage device to send the third user data to the third mobile terminal according to the data identifier of the third user data.

The data identifier may include information such as a file name and so on. Since there is a plurality of user data stored in the network-side storage device, a simple data identifier such as a file name cannot uniquely identify the user data stored in the network-side storage device under normal circumstances. Therefore, in an implementation, the network-side storage device may further associate and store the user identifier of the first mobile terminal and the data identifier of the third user data. In contrast, the user data from the first mobile terminal which is stored in the network-side storage device is less, and can be uniquely identified by a simple data identifier such as a file name.

In the implementations of the present disclosure, during the data transmission from the first mobile terminal to the second mobile terminal through the direct communication connection established, when the first user data transmission is in an abnormal status, the first mobile terminal sends, to the network-side storage device, a part of the first user data that is not transmitted to the second mobile terminal due to transmission abnormality, thereby transferring the direct communication connection user data that is not transmitted due to transmission abnormality with the aid of the network-side storage device, according to user's requirement.

The present disclosure further relates to a method for data transmission using a second mobile terminal. The method includes the follows: establishing a direct communication connection to a first mobile terminal; receiving first user data from the first mobile terminal through the direct communication connection established; detecting the transmission status of the first user data, during the transmission of the first user data; sending a download request to the network-side storage device, based on a determination that the transmission status detected of the first user data is abnormal, wherein the download request includes user identifier of the second mobile terminal; receiving second user data from the network-side storage device, wherein the second user data is a part of the first user data that is not transmitted due to transmission abnormality.

Figure 5:
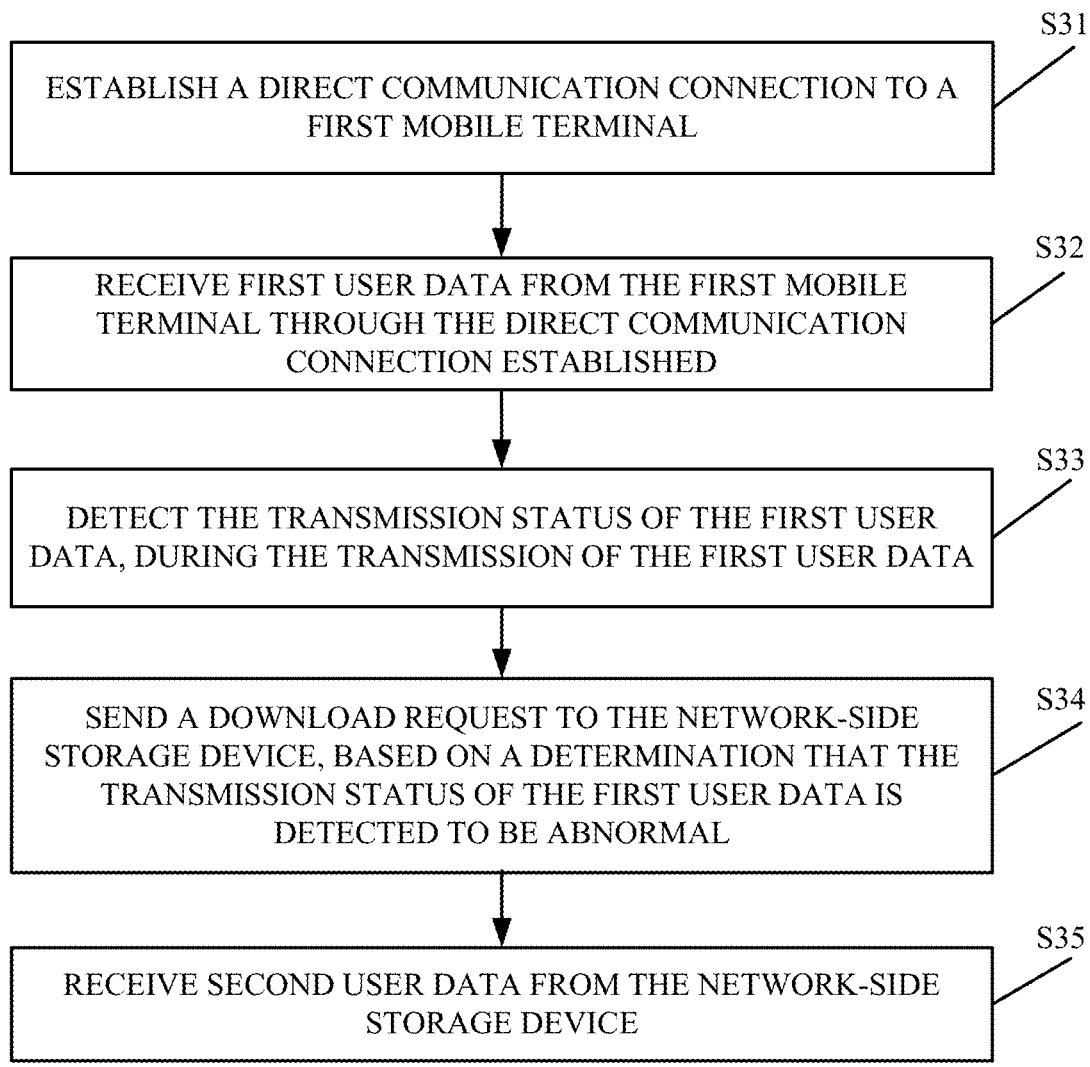
FIG. 5 is a flow chart of another method for data transmission in accordance with an implementation of the present disclosure.

FIG. 5 is a flow chart of another method for data transmission in accordance with an implementation of the present disclosure. Specifically, the method may be performed by a second mobile terminal. The method of data transmission in the implementation of the present disclosure may include operations at blocks illustrated in FIG. 5.

At block S31, a direct communication connection to a first mobile terminal is established.

At block S32, first user data is received from the first mobile terminal through the direct communication connection established.

At block S33, the transmission status of the first user data is detected, during the transmission of the first user data.

Specifically, specific technical details of blocks S31 to S33 of the implementation of the present disclosure may respectively refer to the related technical details of blocks S11 to S13 of the implementation of the present disclosure with reference to FIG. 3.

At block S34, a download request is sent to the network-side storage device, based on a determination that the transmission status detected of the first user data is abnormal.

Based on a determination that the first user data transmission from the first mobile terminal to the second mobile terminal through the direct communication connection is in an abnormal status, in order to obtain the second user data that is not transmitted due to transmission abnormality, the second mobile terminal may send the download request to the network-side storage device which stores the second user data. The download request includes the user identifier of the second mobile terminal.

At block S35, second user data is received from the network-side storage device.

In an implementation, the network-side storage device associates and stores user data and user identifier of a target terminal of the user data. For example, the network-side storage device may associate and store the user identifier of the second mobile terminal and the second user data. After receiving the download request from the second mobile terminal, the network-side storage device may search out the second user data associated with the user identifier of the second mobile terminal, and then send the second user data to the second mobile terminal. Therefore, the second mobile terminal can receive the second user data from the network-side storage device.

In the implementations of the present disclosure, when the first user data transmission from the first mobile terminal to the second mobile terminal through the direct communication connection established is in an abnormal status, a part of the first user data that is not transmitted to the second mobile terminal due to transmission abnormality may be stored in the network-side storage device, and the second mobile terminal may obtain the part of the first user data from the network-side storage device, thereby transferring the direct communication connection user data that is not transmitted due to transmission abnormality with the aid of the network-side storage device.

Figure 6:
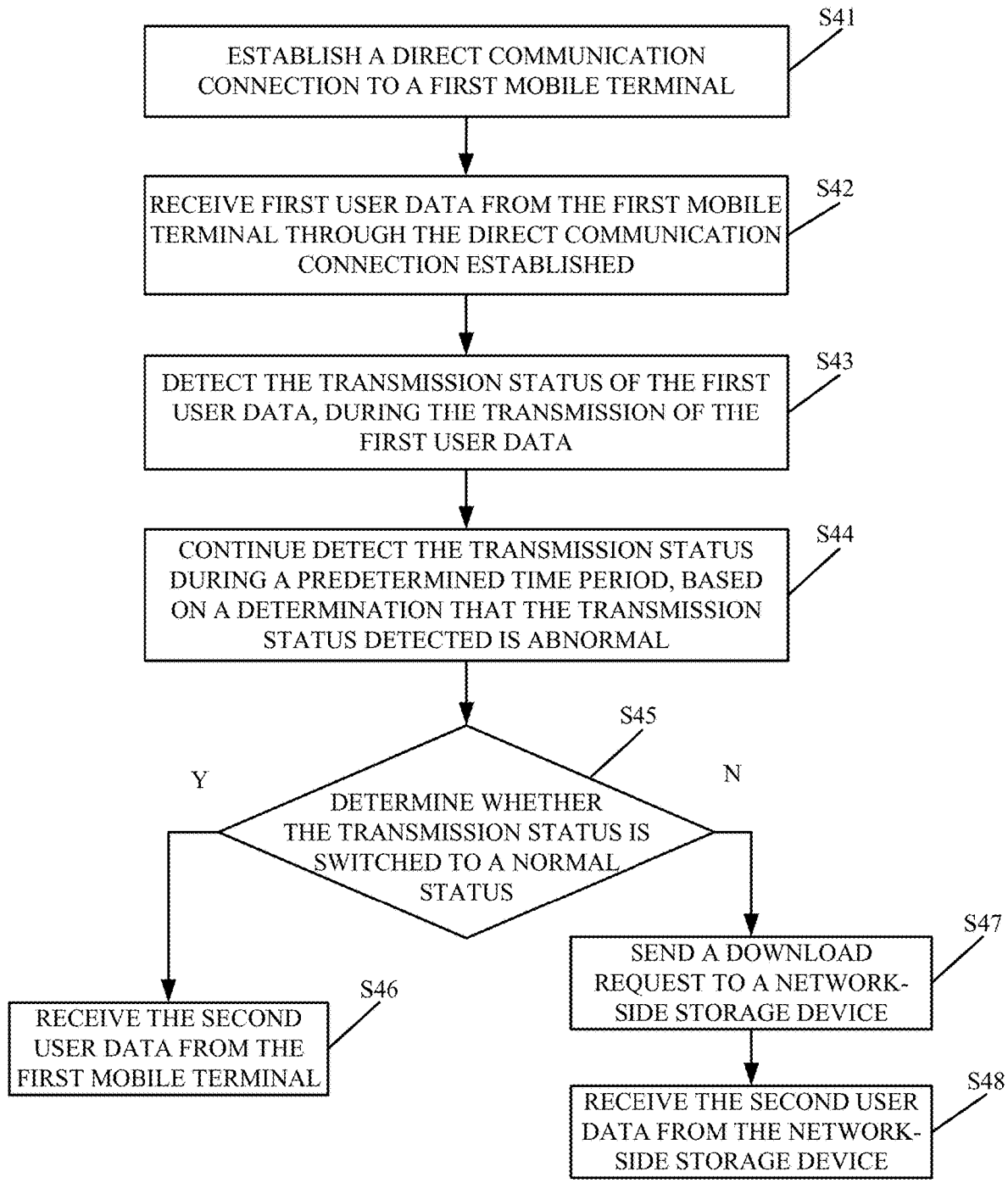
FIG. 6 is a flow chart of another method for data transmission in accordance with an implementation of the present disclosure.

Further, FIG. 6 is a flow chart of another method for data transmission in accordance with an implementation of the present disclosure. Specifically, the method may be performed by a second mobile terminal. The method of data transmission in the implementation of the present disclosure may include operations at blocks illustrated in FIG. 6.

At block S41, a direct communication connection to a first mobile terminal is established.

At block S42, first user data is received from the first mobile terminal through the direct communication connection established.

At block S43, the transmission status of the first user data is detected, during the transmission of the first user data.

Specifically, specific technical details of blocks S41 to S43 of the implementation of the present disclosure may respectively refer to the related technical details of blocks S11 to S13 of the implementation of the present disclosure with reference to FIG. 3.

At block S44, the transmission status of the first user data is continuously detected during a predetermined time period, based on a determination that the transmission status detected of the first user data is abnormal.

At block S45, whether the transmission status is switched to a normal status within the predetermined time period is determined. Based on a determination that the transmission status is switched to a normal status, the process goes to block S46. Based on a determination that the transmission status does not return to a normal status, the process goes to block S47.

The transmission status of the first user data includes a normal status and an abnormal status. In an implementation, the causes of the transmission status of the user data to be in an abnormal status, that is, the causes of the transmission abnormality or the transmission interruption may include that: the movements of the first mobile terminal and/or the second mobile terminal result in the distance between the first mobile terminal and the second mobile terminal exceeding transmittable distance of the direct communication connection; or the associated user of the first mobile terminal and/or the associated user of the second mobile terminal have left the current transmission location, which causes the user data cannot be further transmitted between the first mobile terminal and the second mobile terminal through the direct communication connection; or significant external interference and so on.

At block S46, the second user data is received from the first mobile terminal.

The second user data is a part of the first user data that is not transmitted to the second mobile terminal due to transmission abnormality. Within the predetermined time period, since the movements of the first mobile terminal and/or the second mobile terminal make the distance between the first mobile terminal and the second mobile terminal less than the transmittable distance of the direct communication connection, or the external interference is reduced and so on, the transmission status of the first user data is switched to a normal status, and the second mobile terminal may continue to receive the second user data from the first mobile terminal through the direct communication connection.

At block S47, a download request is sent to a network-side storage device.

If the transmission status of the first user data is still abnormal within the predetermined time period, the direct communication connection established may be interrupted. In order to obtain the second user data that is not transmitted to the second mobile terminal due to transmission abnormality, the second mobile terminal can send a download request to the network-side storage device which has stored the second user data. The download request includes the user identifier of the second mobile terminal.

At block S48, the second user data is received from the network-side storage device.

In an implementation, the network-side storage device associates and stores the user data and user identifier of a target terminal of the user data. For example, the network-side storage device may associate and store the user identifier of the second mobile terminal and the second user data. After receiving the download request from the second mobile terminal, the network-side storage device may search out the second user data associated with the user identifier of the second mobile terminal, and then send the second user data to the second mobile terminal. Therefore, the second mobile terminal can obtain the second user data from the network-side storage device.

In an implementation, the network-side storage device may further associate and store third user data except for the second user data and the user identifier of the second mobile terminal. Therefore, the second mobile terminal can obtain the third user data from the network-side storage device. The third user data may include other user data except for the second user data, which cannot be transmitted from the first mobile terminal to the second mobile terminal through the direct communication connection due to transmission interruption. In an implementation, the first mobile terminal may send a second storage request including the third user data to the network-side storage device, therefore the network-side storage device can associate and store the user identifier of the second mobile terminal and the third user data.

In an implementation, the third user data may further include user data which is transmitted to the second mobile terminal from another mobile terminal except for the first mobile terminal.

In the implementations of the present disclosure, when the first user data transmission from the first mobile terminal to the second mobile terminal through the direct communication connection established is in an abnormal status, a part of the first user data that is not transmitted to the second mobile terminal due to transmission abnormality may be stored in the network-side storage device, and the second mobile terminal may obtain the part of the first user data from the network-side storage device, thereby transferring the direct communication connection user data that is not transmitted due to transmission abnormality with the aid of the network-side storage device.

The present disclosure further relates to a method for data transmission using a network-side storage device. The method includes the follows: when a first storage request is received from a first mobile terminal, associating and storing the user identifier of the second mobile terminal and the second user data, wherein a direct communication connection for transmitting first user data is established between the first mobile terminal and the second mobile terminal, and the second user data is a part of the first user data that is not transmitted to the second mobile terminal from the first mobile terminal through the direct communication connection due to transmission abnormality; when a download request is received from the second mobile terminal, searching for user data associated with the user identifier of the second mobile terminal from data stored, according to the user identifier of the second mobile terminal included in the download request from the second mobile terminal; and sending the user data searched to the second mobile terminal.

Figure 7:
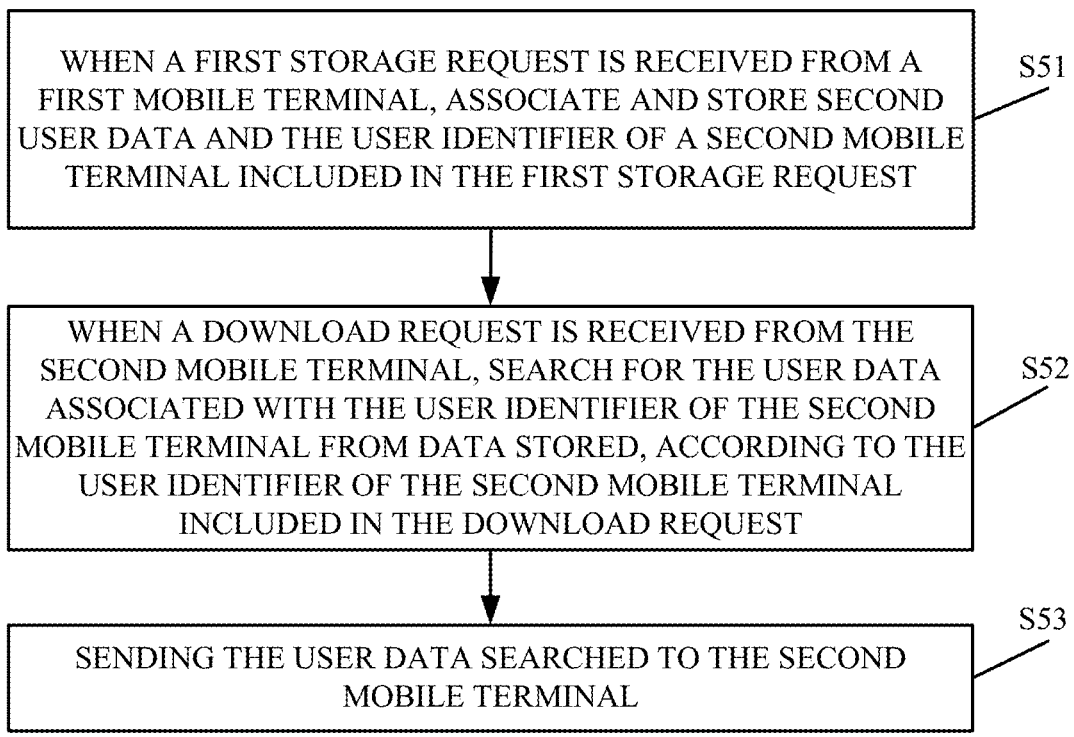
FIG. 7 is a flow chart of another method for data transmission in accordance with an implementation of the present disclosure.

FIG. 7 is a flow chart of another method for data transmission in accordance with an implementation of the present disclosure. Specifically, the method may be performed by a network-side storage device. The method of data transmission in the implementation of the present disclosure may include operations at blocks illustrated in FIG. 7.

At block S51, when a first storage request is received from a first mobile terminal, user identifier of a second mobile terminal and second user data included in the first storage request are associated and stored.

In the implementation, a direct communication connection for transmitting first user data is established between the first mobile terminal and the second mobile terminal. The second user data is a part of the first user data that is not transmitted to the second mobile terminal from the first mobile terminal through the direct communication connection due to transmission abnormality.

After the user identifier of the second mobile terminal and second user data being associated and stored, the network-side storage device can determine the second user data according to the user identifier of the second mobile terminal.

At block S52, when a download request is received from the second mobile terminal, the user data associated with the user identifier of the second mobile terminal is searched from data stored, according to the user identifier of the second mobile terminal included in the download request from the second mobile terminal.

In an implementation, the second user data stored in the network-side storage device may be user data that is not transmitted from the first mobile terminal to the second mobile terminal through the direct communication connection due to one transmission abnormality, or due to multiple transmission abnormality. In an implementation, the network-side storage device may further store third user data which cannot be transmitted from the first mobile terminal to the second mobile terminal through the direct communication connection due to transmission interruption, and the third user data is different from the second user data. In an implementation, the network-side storage device may search all of the user data (including the second user data and the third user data) associated with the user identifier of the second mobile terminal.

At block S53, the user data searched is sent to the second mobile terminal.

In an implementation, the network-side storage device may send at least one of the second user data searched and the third user data that are associated with the user identifier of the second mobile terminal to the second mobile terminal. In an implementation, the user data searched may be deleted from the network-side storage device after the network-side storage device sending the user data searched to the second mobile terminal.

In the implementations of the present disclosure, during the data transmission from the first mobile terminal to the second mobile terminal through the direct communication connection established, when the data transmission is in an abnormal status, the network-side storage device may store a part of the first user data that is not transmitted from the first mobile terminal to the second mobile terminal due to transmission abnormality, and may send the part of the first user data to the second mobile terminal, thereby storing and further transferring the direct communication connection user data that is not transmitted due to transmission abnormality with the aid of the network-side storage device.

Figure 8:
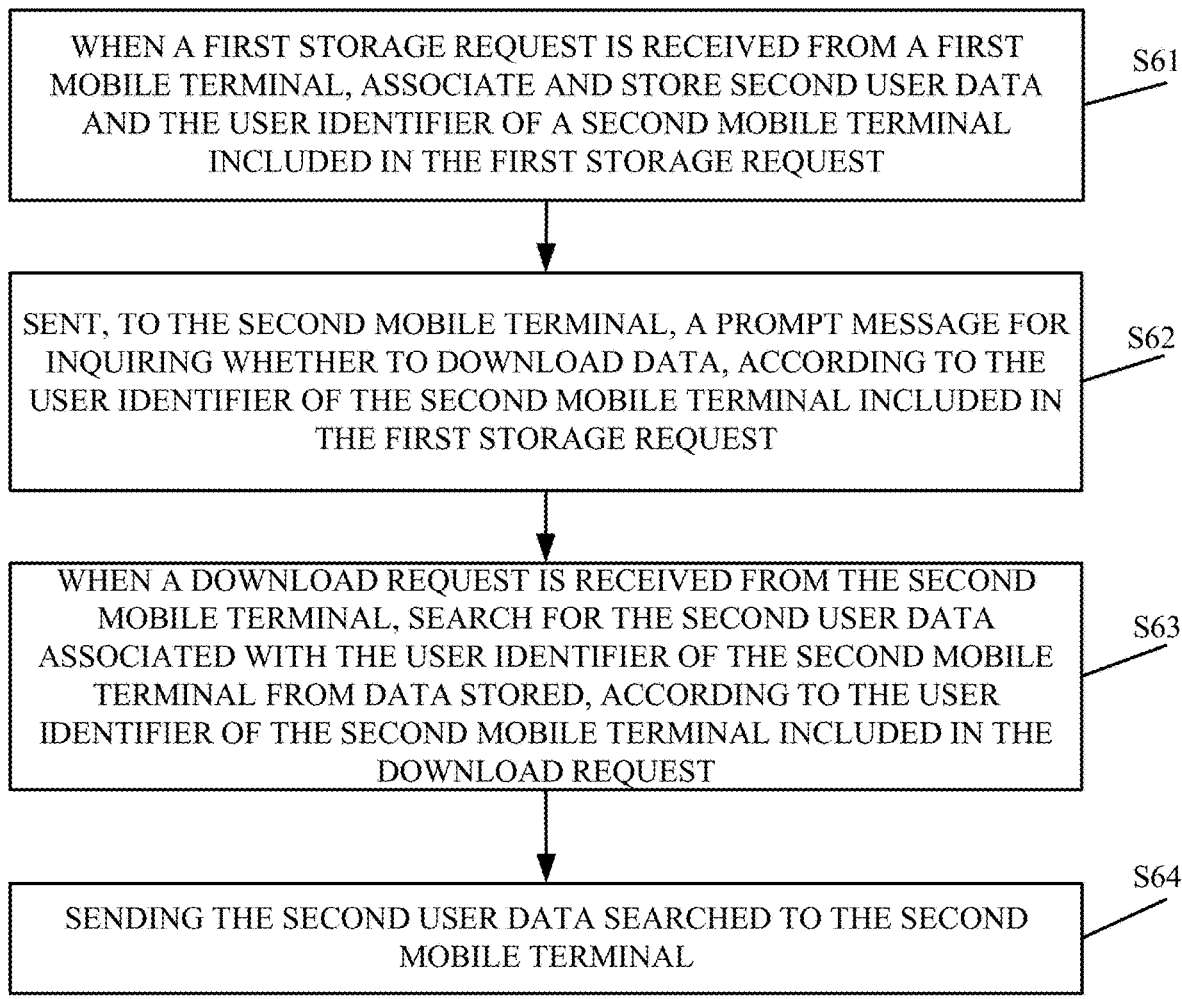
FIG. 8 is a flow chart of another method for data transmission in accordance with an implementation of the present disclosure.

FIG. 8 is a flow chart of another method for data transmission in accordance with an implementation of the present disclosure. Specifically, the method may be performed by a network-side storage device. The method of data transmission in the implementation of the present disclosure may include operations at blocks illustrated in FIG. 8.

At block S61, when a first storage request is received from a first mobile terminal, user identifier of a second mobile terminal and second user data included in the first storage request are associated and stored.

Specifically, specific technical details of block S61 of the implementation of the present disclosure may respectively refer to the related technical details of block S51 of the implementation of the present disclosure with reference to FIG. 7.

At block S62, a prompt message for inquiring whether to download data is sent to the second mobile terminal, according to the user identifier of the second mobile terminal included in the first storage request, when the second mobile terminal has accessed to the network-side storage device.

In an implementation, the prompt message sent to the second mobile terminal includes data identifier of user data to be download which is associated with the user identifier of the second mobile terminal.

In an implementation, the first storage request may further include data identifier of the second user data and the user identifier of the first mobile terminal.

In an implementation, a prompt message for inquiring whether to download data is sent to the second mobile terminal, according to the user identifier of the second mobile terminal included in the first storage request, may specifically include: a prompt message for inquiring user whether to download the second user data having the data identifier and being from the first mobile terminal is sent to the second mobile terminal, according to the user identities of the first mobile terminal and the second mobile terminal, and the data identifier of the second user data included in the first storage request. When the network-side storage device has stored the second user data, and has even further stored third user data which cannot be transmitted from the first mobile terminal to the second mobile terminal due to transmission interruption, user may select, according to the prompt message, user data to be download from all the user data associated with the user identifier of the second mobile terminal which is stored in the network-side storage device.

At block S63, when a download request is received from the second mobile terminal, the second user data associated with the user identifier of the second mobile terminal is searched from data stored, according to the user identifier of the second mobile terminal included in the download request from the second mobile terminal.

It should be understood that, when the first storage request includes the user identifier of the second mobile terminal, the second user data, the data identifier of the second user data and the user identifier of the first mobile terminal, there are corresponding relationships among the user identifier of the second mobile terminal, the second user data, the data identifier of the second user data and the user identifier of the first mobile terminal.

Therefore, the network-side storage device may search the user data stored which is from the first mobile terminal and having the data identifier and associated with the user identifier of the second mobile terminal, according to the user identifier of the second mobile terminal included in the download request.

In an implementation, the network-side storage device deletes specific user data stored when a download reject message is received from the second mobile terminal. The download reject message includes the specific user data to be sent to the second mobile terminal.

In an implementation, the network-side storage device may retain the user data which is sent from the first mobile terminal and is associated with the user identifier of the second mobile terminal. When the first mobile terminal needs to transmit the user data that is stored in the network-side storage device to a third mobile terminal, the first mobile terminal only needs to send the user identifier of the third mobile terminal and the data identifier of the user data to the network-side storage device, without sending the user data to the network-side storage device again. The network-side storage device may search the user data according to the data identifier of the user data. When the third mobile terminal has accessed to the network-side storage device, the network-side storage device may send the user data searched to the third mobile terminal according to the user identifier of the third mobile terminal.

At block S64, the second user data searched is sent to the second mobile terminal.

In an implementation, the network-side storage device may also store the third user data associated with the user identifier of the second mobile terminal. When the download request is received from the second mobile terminal, the network-side storage device may search out the stored third user data associated with the user identifier of the second mobile terminal, according to the user identifier of the second mobile terminal included in the download request, and then send the third user data to the second mobile terminal.

In an implementation, after the second user data and/or third user data which are associated with the user identifier of the second mobile terminal being sent to the second mobile terminal, the network-side storage device may delete the second user data and/or third user data sent.

In the implementations of the present disclosure, during the data transmission from the first mobile terminal to the second mobile terminal through the direct communication connection established, when the data transmission is in an abnormal status, the network-side storage device may store a part of the first user data that is not transmitted from the first mobile terminal to the second mobile terminal due to transmission abnormality, and may send the part of the first user data to the second mobile terminal, thereby storing and further transferring the direct communication connection user data that is not transmitted due to transmission abnormality with the aid of the network-side storage device.

The present disclosure further relates to a device for data transmission using a first mobile terminal. The device includes a connecting unit, a detecting unit, an accessing unit, and a sending unit. The connecting unit is configured to establish a direct communication connection to a second mobile terminal. The sending unit is configured to transmit first user data to the second mobile terminal through the direct communication connection established. The detecting unit is configured to detect the transmission status of the first user data, during the transmission of the first user data. The accessing unit is configured to access to a network-side storage device based on a determination that an abnormal transmission status is detected. The sending unit is further configured to send a first storage request to the network-side storage device, wherein the first storage request includes second user data and the user identifier of the second mobile terminal, wherein the second user data is a part of the first user data that is not transmitted to the second mobile terminal due to transmission abnormality.

Figure 9:
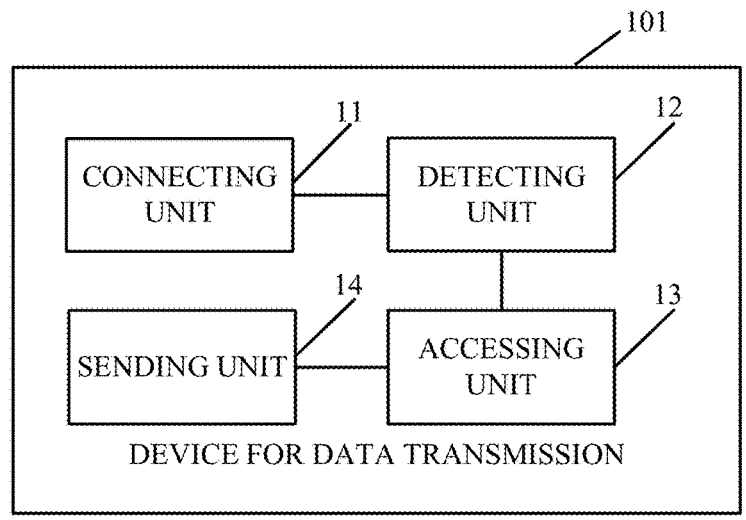
FIG. 9 is a structure diagram of a device for data transmission in accordance with an implementation of the present disclosure.

FIG. 9 is a structure diagram of a device 101 for data transmission in accordance with an implementation of the present disclosure. Specifically, the device 101 may be applied to a first mobile terminal. As illustrated in FIG. 9, the device 101 for data transmission may include a connecting unit 11, a detecting unit 12, an accessing unit 13 and a sending unit 14.

The connecting unit 11 is configured to establish a direct communication connection between the first mobile terminal and a second mobile terminal.

In the implementation of the present disclosure, the direct communication connection may be communication connection based on communication technologies such as Bluetooth, infrared, NFC, Wi-Fi connection and so on. In an implementation, the function of the connecting unit 11 may be performed by a communication interface.

The sending unit 14 is configured to transmit first user data to the second mobile terminal through the direct communication connection. In an implementation, the function of the sending unit 14 may be performed by a transmitter.

The detecting unit 12 is configured to detect the transmission status of the first user data, during the transmission of the first user data.

The first user data may be files such as images, audios, videos, documents and so on. The transmission status of the first user data includes a normal status and an abnormal status. In an implementation, the function of the detecting unit 12 may be performed by a processing chip or a processor.

The accessing unit 13 is configured to access to a network-side storage device, based on a determination that the transmission status detected of the first user data is abnormal.

The network-side storage device may be, for example, a cloud server and so on. In an implementation, the function of the accessing unit 13 may be performed by a network interface.

The sending unit 14 is configured to send a first storage request to the network-side storage device.

The first storage request includes may include a part of the first user data that is not transmitted to the second mobile terminal due to transmission abnormality, namely second user data, and the user identifier of the second mobile terminal.

In the implementations of the present disclosure, during the data transmission from the first mobile terminal to the second mobile terminal through the direct communication connection established, when the first user data transmission is in an abnormal status, the first mobile terminal sends, to the network-side storage device, a part of the first user data that is not transmitted to the second mobile terminal due to transmission abnormality, thereby transferring the direct communication connection user data that is not transmitted due to transmission abnormality with the aid of the network-side storage device.

Figure 10:
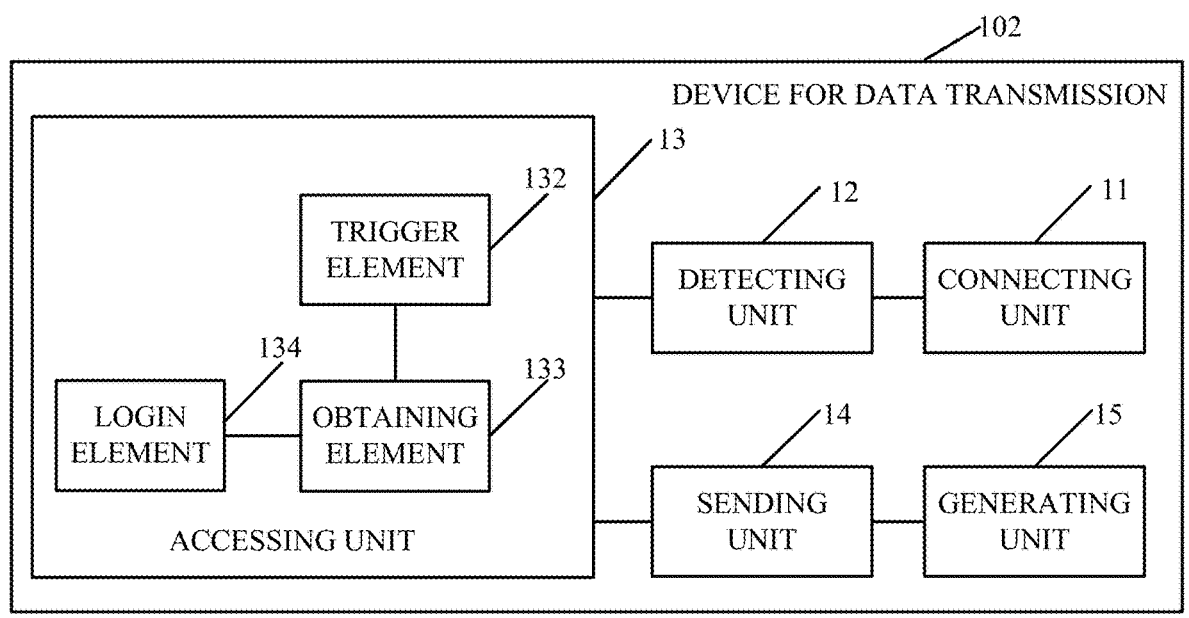
FIG. 10 is a structure diagram of another device for data transmission in accordance with an implementation of the present disclosure.

Further, FIG. 10 is a structure diagram of another device 102 for data transmission in accordance with an implementation of the present disclosure. Specifically, the device 102 in the implementation may include the connecting unit 11, the detecting unit 12, the accessing unit 13 and the sending unit 14 which are included in the device 101 and are illustrated in FIG. 9. In the implementation of the present disclosure, the accessing unit 13 may specifically include a trigger element 132, an obtaining element 133 and a login element 134.

The detecting unit 12 is further configured to detect whether the first mobile terminal is connected to a network.

The trigger element 132 is configured to enable a network connection function to connect the first mobile terminal to the network, when the detecting unit 12 detects that the first mobile terminal is unconnected to the network.

The obtaining element 133 is configured to obtain the user information of the user of the first mobile terminal for network storage.

The login element 134 is configured to log in to a network-side storage device after the first mobile terminal being connected to the network, according to the user information obtained by the obtaining element 133.

In an implementation, the device 102 for data transmission may further include a generating unit 15, the generating unit 15 is configured to generate a first storage request.

The first storage request may include the second user data that is not transmitted to the second mobile terminal due to transmission abnormality, and the user identifier of the second mobile terminal. In an implementation, the function of the generating unit 15 may be performed by a processing chip or a processor.

In an implementation, the sending unit 14 is further configured to send a second storage request to the network-side storage device. The second storage request includes third user data and the user identifier of the second mobile terminal and, to transfer the third user data to the second mobile terminal through the network-side storage device. The third user data is different from the second user data.

In an implementation, the second storage request may further include data identifier of the third user data.

In an implementation, the sending unit 14 is further configured to send the user identifier of a third mobile terminal and the data identifier of the third user data to the network-side storage device, to transfer the third user data to the third mobile terminal through the network-side storage device.

In the implementations of the present disclosure, during the data transmission from the first mobile terminal to the second mobile terminal through the direct communication connection established, when the first user data transmission is in an abnormal status, the first mobile terminal sends, to the network-side storage device, a part of the first user data that is not transmitted to the second mobile terminal due to transmission abnormality, thereby transferring the direct communication connection user data that is not transmitted due to transmission abnormality with the aid of the network-side storage device.

The present disclosure further relates to a device for data transmission using a second mobile terminal. The device includes a connecting unit, a sending unit, a receiving unit, and a detecting unit. The connecting unit is configured to establish a direct communication connection to a first mobile terminal. The receiving unit is configured to receive first user data from the first mobile terminal through the direct communication connection. The detecting unit is configured to detect the transmission status of the first user data, during the transmission of the first user data. The sending unit is configured to send a download request to the network-side storage device based on a determination that the transmission status detected of the first user data is abnormal. The download request includes a user identifier of the second mobile terminal. The receiving unit is further configured to receive second user data from the network-side storage device, wherein the second user data is a part of the first user data that has not transmitted due to transmission abnormality.

Figure 11:
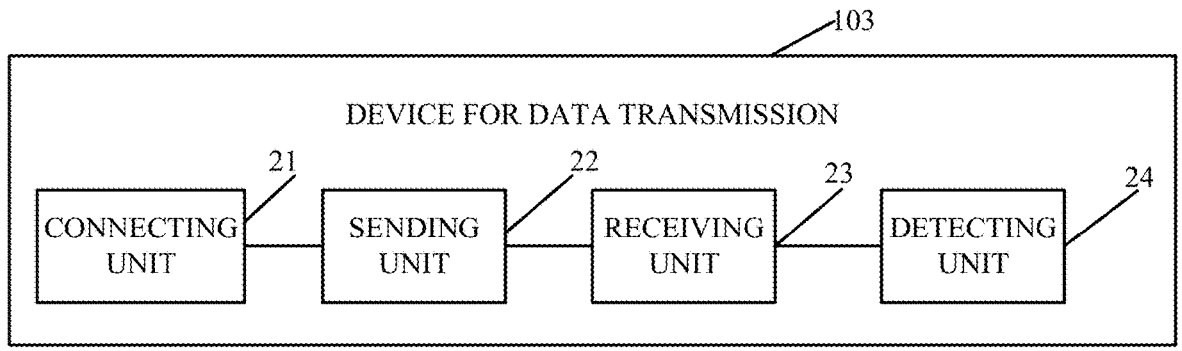
FIG. 11 is a structure diagram of another device for data transmission in accordance with an implementation of the present disclosure.

FIG. 11 is a structure diagram of a device 103 for data transmission in accordance with an implementation of the present disclosure. Specifically, the device 103 may be applied to a second mobile terminal. As illustrated in FIG. 11, the device 103 for data transmission may include a connecting unit 21, a sending unit 22, a receiving unit 23 and a detecting unit 24.

The connecting unit 21 is configured to establish a direct communication connection between the second mobile terminal and a first mobile terminal.

In the implementation of the present disclosure, the direct communication connection may be communication connection based on communication technologies such as Bluetooth, infrared, NFC, Wi-Fi connection and so on. In an implementation, the function of the connecting unit 21 may be performed by a communication interface.

The receiving unit 23 is configured to receive first user data from the first mobile terminal through the direct communication connection established. In an implementation, the function of the receiving unit 23 may be performed by a receiver.

The detecting unit 24 is configured to detect the transmission status of the first user data, during the transmission of the first user data.

The sending unit 22 is configured to send a download request to a network-side storage device, based on a determination that the transmission status detected of the first user data is abnormal.

The download request includes the user identifier of the second mobile terminal. In an implementation, the function of the sending unit 22 may be performed by a transmitter.

The receiving unit 23 is further configured to receive the second user data from the network-side storage device.

The second user data is a part of the first user data that is not transmitted to the second mobile terminal due to transmission abnormality.

In the implementations of the present disclosure, when the first user data transmission from the first mobile terminal to the second mobile terminal through the direct communication connection established is in an abnormal status, a part of the first user data that is not transmitted to the second mobile terminal due to transmission abnormality may be stored in the network-side storage device, and the second mobile terminal may obtain the part of the first user data from the network-side storage device, thereby transferring the direct communication connection user data that is not transmitted due to transmission abnormality with the aid of the network-side storage device.

Figure 12:
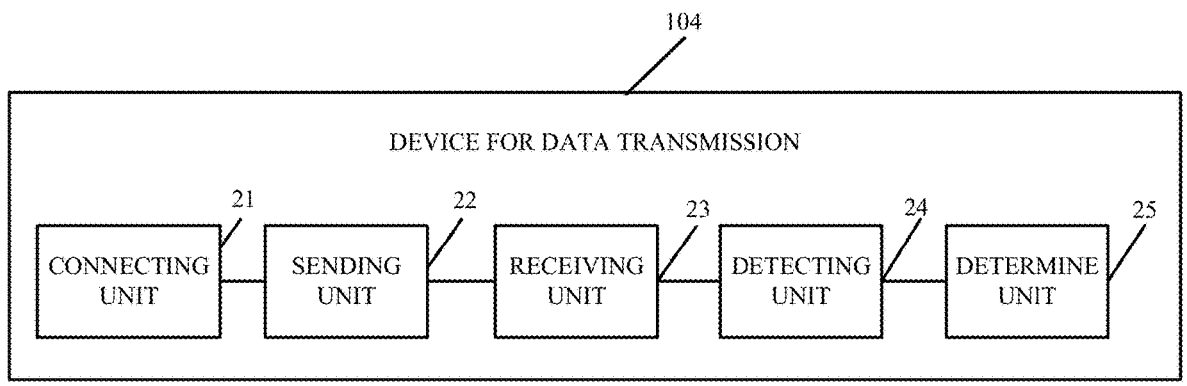
FIG. 12 is a structure diagram of another device for data transmission in accordance with an implementation of the present disclosure.

Further, FIG. 12 is a structure diagram of another device 104 for data transmission in accordance with an implementation of the present disclosure. Specifically, the device 104 in the implementation may include the connecting unit 21, the sending unit 22, the receiving unit 23 and the detecting unit 24 which are included in the device 103 and are illustrated in FIG. 11.

In the implementation of the present disclosure, the detecting unit 24 is further configured to continue detecting the transmission status during a predetermined time period, based on a determination that the transmission status detected of the first user data is abnormal. In an implementation, the device 104 may further include a determine unit 25, the determine unit 25 is configured to determine whether the transmission status of the first user data is switched to a normal status.

The receiving unit 23 is further configured to receive the second user data from the first mobile terminal, based on a determination that the determine unit 25 determines that the transmission status of the first user data is switched to a normal status.

The sending unit 22 is further configured to send a download request to the network-side storage device, based on a determination that the determine unit 25 determines that the transmission status does not return to a normal status.

In an implementation, the receiving unit 23 is further configured to receive third user data from the network-side storage device. The third user data may include other user data except for the second user data, which is not transmitted from the first mobile terminal to the second mobile terminal through the direct communication connection due to transmission interruption, and the user data which is to be transmitted from a third mobile terminal to the second mobile terminal.

The first mobile terminal is different from the third mobile terminal.

In the implementations of the present disclosure, when the first user data transmission from the first mobile terminal to the second mobile terminal through the direct communication connection established is in an abnormal status, a part of the first user data that is not transmitted to the second mobile terminal due to transmission abnormality may be stored in the network-side storage device, and the second mobile terminal may obtain the part of the first user data from the network-side storage device, thereby transferring the direct communication connection user data that is not transmitted due to transmission abnormality with the aid of the network-side storage device.

The present disclosure further relates to a device for data transmission using a network-side storage device. The device includes a storage unit, a search unit and a sending unit and a receiving unit. The receiving unit is configured to receive a first storage request from a first mobile terminal, and the first storage request includes a user identifier of a second mobile terminal and second user data. A direct communication connection for transmitting first user data is established between the first mobile terminal and the second mobile terminal, and the second user data is a part of the first user data that is not transmitted to the second mobile terminal from the first mobile terminal through the direct communication connection due to transmission abnormality. The storage unit is configured to associate and store the user identifier of the second mobile terminal and the second user data. The receiving unit is further configured to receive a download request from the second mobile terminal, and the download request from the second mobile terminal includes the user identifier of the second mobile terminal. The search unit is configured to search for user data associated with the user identifier of the second mobile terminal from data stored, according to the user identifier of the second mobile terminal included in the download request from the second mobile terminal. The sending unit is configured to send the user data searched to the second mobile terminal.

Figure 13:
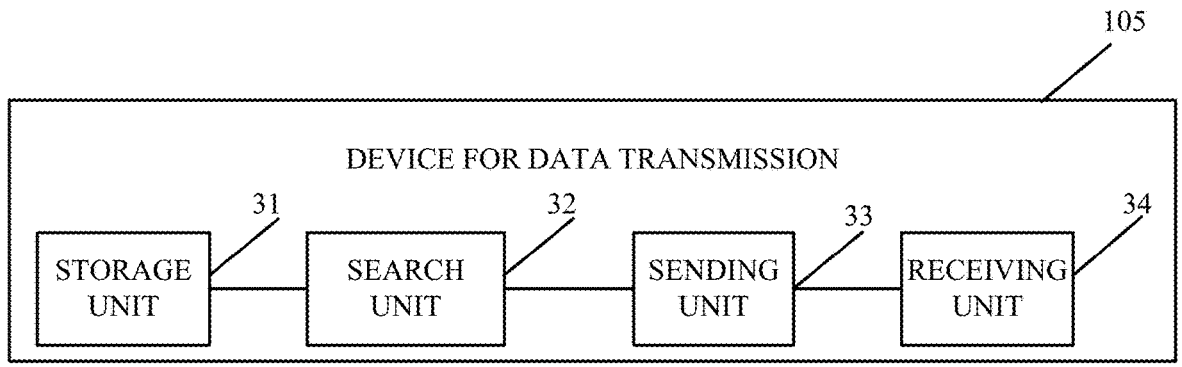
FIG. 13 is a structure diagram of another device for data transmission in accordance with an implementation of the present disclosure.

FIG. 13 is a structure diagram of a device 105 for data transmission in accordance with an implementation of the present disclosure. Specifically, the device 105 may be applied to a network-side storage device. As illustrated in FIG. 13, the device 105 for data transmission may include a storage unit 31, a search unit 32 and a sending unit 33 and a receiving unit 34.

The receiving unit 34 is configured to receive a first storage request from a first mobile terminal. In the implementation, the first storage request includes a user identifier of a second mobile terminal and second user data.

In an implementation, a direct communication connection for transmitting first user data is established between the first mobile terminal and the second mobile terminal. The second user data is a part of the first user data that is not transmitted to the second mobile terminal from the first mobile terminal through the direct communication connection due to transmission abnormality.

In an implementation, the function of the receiving unit 34 may be performed by a receiver.

The storage unit 31 is configured to associate and store the user identifier of a second mobile terminal and the second user data included in the first storage request.

In an implementation, the storage unit 31 may be various storage media such as a mobile disk, a Read-Only Memory (ROM), a Random Access Memory (RAM) and so on, which is capable of storing data.

The receiving unit 34 is further configured to receive a download request from the second mobile terminal. In the implementation, the download request from the second mobile terminal includes the user identifier of the second mobile terminal.

The search unit 32 is configured to search for user data associated with the user identifier of the second mobile terminal from data stored, according to the user identifier of the second mobile terminal included in the download request from the second mobile terminal.

In an implementation, the function of the search unit 32 may be performed by a processing chip or a processor.

The sending unit 33 is configured to send the user data searched to the second mobile terminal.

In an implementation, the user data searched may be deleted from the storage unit 31 after the sending unit 33 sending the user data searched to the second mobile terminal. In an implementation, the function of the sending unit 33 may be performed by a transmitter.

In the implementations of the present disclosure, during the data transmission from the first mobile terminal to the second mobile terminal through the direct communication connection established, when the data transmission is in an abnormal status, the network-side storage device may store a part of the first user data that is not transmitted from the first mobile terminal to the second mobile terminal due to transmission abnormality, and may send the part of the first user data to the second mobile terminal, thereby storing and further transferring the direct communication connection user data that is not transmitted due to transmission abnormality with the aid of the network-side storage device.

Figure 14:
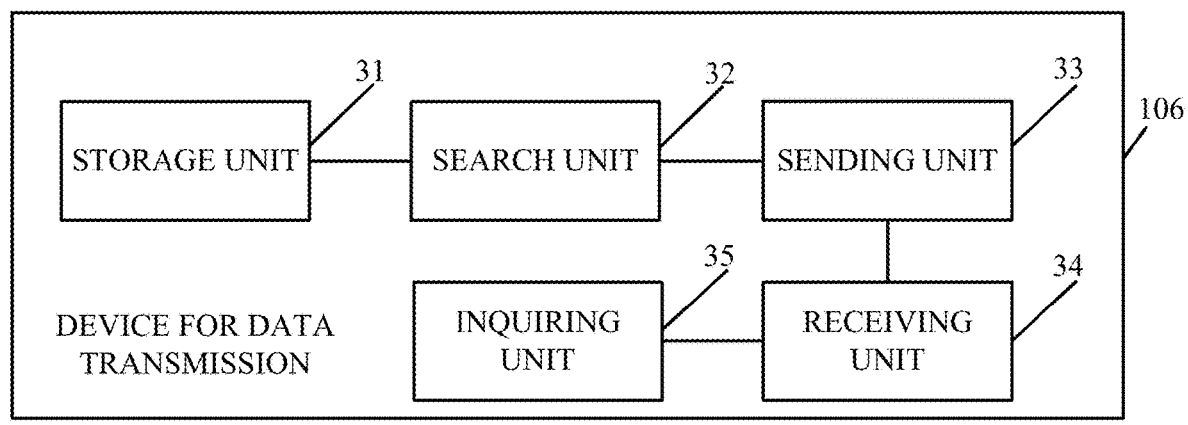
FIG. 14 is a structure diagram of another device for data transmission in accordance with another implementation of the present disclosure.

Further, FIG. 14 is a structure diagram of another device 106 for data transmission in accordance with an implementation of the present disclosure. Specifically, the device 106 in the implementation may include the storage unit 31, the search unit 32, the sending unit 33 and the receiving unit 34 which are included in the device 105 and are illustrated in FIG. 13.

In an implementation, the receiving unit 34 is further configured to receive a second storage request from the first mobile terminal. The second storage request includes third user data and the user identifier of the second mobile terminal, and the third user data is different from the second user data.

In an implementation, the storage unit 31 may further associate and store the user identifier of the second mobile terminal and the third user data.

In an implementation, the sending unit 33 is further configured to send the third user data searched to the second mobile terminal.

In an implementation, the second storage request may further include data identifier of the third user data.

In an implementation, the sending unit 33 is further configured to send the third user data searched to the third mobile terminal, when the user identifier of the third mobile terminal and the data identifier of the third user data is received from the first mobile terminal.

In an implementation, the device 106 for data transmission may further include an inquiring unit 35, the inquiring unit 35 is configured to send, to the second mobile terminal, a prompt message for inquiring whether to download data, according to the user identifier of the second mobile terminal included in at least one of the first storage request and the second storage request. In an implementation, the function of the inquiring unit 35 may be performed by a receiver.

In the implementations of the present disclosure, during the data transmission from the first mobile terminal to the second mobile terminal through the direct communication connection established, when the data transmission is in an abnormal status, the network-side storage device may store a part of the first user data that is not transmitted from the first mobile terminal to the second mobile terminal due to transmission abnormality, and may send the part of the first user data to the second mobile terminal, thereby storing and further transferring the direct communication connection user data that is not transmitted due to transmission abnormality with the aid of the network-side storage device.

The present disclosure further relates to a mobile terminal. The mobile terminal includes a memory configured to store computer-readable program codes; a processor configured to execute the computer-readable program codes to perform the method for data transmission as illustrated in any implementation of the present disclosure with reference to FIG. 3 to FIG. 6.

Figure 15:
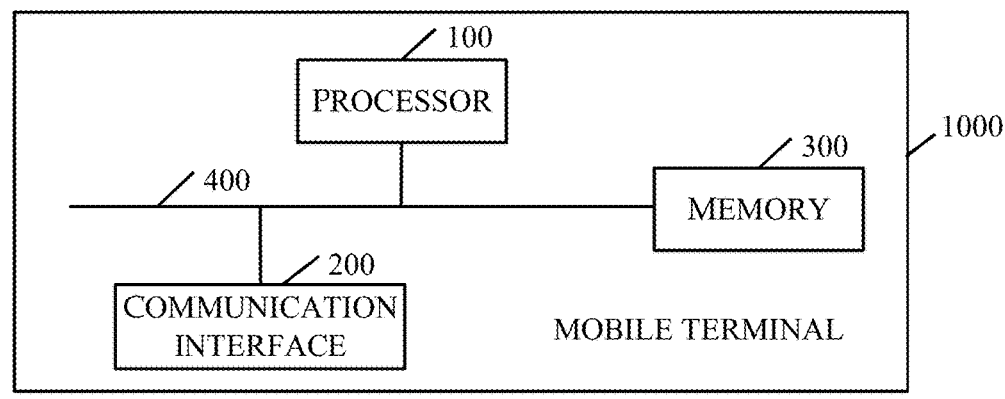
FIG. 15 is a structure diagram of a mobile terminal according to an implementation of the present disclosure.

FIG. 15 is a structure diagram of a mobile terminal 1000 in accordance with an implementation of the present disclosure, and the mobile terminal is configured to execute the method for data transmission as illustrated in any implementation of the present disclosure with reference to FIG. 3 to FIG. 6. Specifically, as illustrated in FIG. 15, the mobile terminal (referred to as the "terminal") 1000 may include the following components: at least one processor 100, at least one communication interface 200, a memory 300, and so on. These components are coupled and communicate with each other via one or more buses 400. Those skilled in the art should understand that, the structure of the mobile terminal illustrated in FIG. 15 is not limit the implementation of the present disclosure. The structure can be a bus structure, can also be a star structure, and can include more or fewer components, or some components can be combined, or components can be arranged in a different way.

The processor 100 is a control center of the terminal, and is coupled to various components of the terminal via various interfaces and lines. The processor 100 runs or executes program code and/or modules stored in the memory 300, and invokes data stored in the memory 300 to execute various functions and data processing of the terminal. The processor 100 may be formed by an integrated circuit (IC), for example, may be formed by a single package IC, or may be formed by coupling multiple ICs having the same function or different functions. For example, the processor 100 may only include a central processing unit (CPU), or may be a combination of the CPU, a digital signal processor (DSP), a graphics processing unit (GPU), and various control chips. In the implementations of the present disclosure, the CPU may be a single computing core, or may also be multiple computing cores.

The communication interface 200 may include a standard touch screen, a keyboard, a display screen, a speaker, and so on, and may also include a wired interface, a wireless interface, and so on.

The memory 300 may store soft programs and modules. The processor 100 and the communication interface 200 invoke the soft programs and modules stored in the memory 300 to execute various functions and data processing of the mobile terminal. The memory 300 may include a program storing region and a data storing region. The program storing region may store an operating system, computer-readable program codes for at least one function, and so on. The data storing region may store data created according to use of the mobile terminal. In the implementation of the present disclosure, the operating system can be an Android system, an iOS system, a Windows system, and so on.

Specifically, when the mobile terminal in the implementation of the present disclosure is configured to execute the method for data transmission as illustrated in FIG. 3 or FIG. 4 of the present disclosure, the mobile terminal in the implementation of the present disclosure may be the first mobile terminal described in any one of the foregoing implementations. The processor 100 invokes the computer-readable program codes stored in the memory 300 to execute the follows: establishing a direct communication connection to a second mobile terminal; transmitting first user data to the second mobile terminal through the direct communication connection; detecting the transmission status of the first user data, during the transmission of the first user data; accessing to a network-side storage device, based on a determination that the transmission status detected is abnormal; sending a first storage request to the network-side storage device, wherein the first storage request includes second user data and the user identifier of the second mobile terminal, wherein the second user data is a part of the first user data that is not transmitted to the second mobile terminal due to transmission abnormality.

In an implementation, the processor 100 that may be configured to invoke the computer-readable program codes to perform the accessing to a network-side storage device, is further configured to perform the flows: detecting whether the first mobile terminal is connected to a network; enabling a network connection function to connect the first mobile terminal to a network, when the first mobile terminal is unconnected to the network; obtaining the user information of the user of the first mobile terminal for network storage; logging in to a network-side storage device according to the user information obtained, after the first mobile terminal being connected to the network.

In an implementation, the processor 100 invokes the computer-readable program codes stored in the memory 300 to further execute the follows: sending, to the network-side storage device, a second storage request which includes the user identifier of the second mobile terminal and the third user data, to transfer the third user data to the second mobile terminal through the network-side storage device. The third user data is different from the second user data.

In an implementation, the second storage request may further include data identifier of the third user data. The processor 100 invokes the computer-readable program codes stored in the memory 300 to further execute the follows: sending, to the network-side storage device, a third storage request which includes user identifier of a third mobile terminal and data identifier of the third user data, so that the network-side storage device transfers, according to the data identifier of the third user data, the third user data to the third mobile terminal.

In an implementation, the processor 100 invokes the computer-readable program codes stored in the memory 300 to further execute the follows after accessing to a network-side storage device: outputting a prompt message for inquiring whether to use the network-side storage device for data storage; and generating the first storage request when a response signal for storing data using the network-side storage device is received.

In an implementation, the processor 100 that may be configured to invoke the computer-readable program codes to perform the establishing a direct communication connection to a second mobile terminal, is further configured to execute at least one of: establishing a first direct communication connection to a second mobile terminal based on a first transmission technology, wherein the first transmission technology includes at least one of Bluetooth, infrared, and Near Field Communication technology; and establishing a second direct communication connection to the second mobile terminal based on a second transmission technology, wherein the second transmission technology is Wi-Fi hotspot communication technology.

In an implementation, the processor 100 that may be configured to invoke the computer-readable program codes to perform the establishing a direct communication connection to a second mobile terminal, is further configured to execute the flows: establishing a first direct communication connection to a second mobile terminal based on a first transmission technology, wherein the first transmission technology includes at least one of Bluetooth, infrared, and Near Field Communication technology; exchanging connection data of a second transmission technology with the second mobile terminal through the first direct communication connection established; and establishing a second direct communication connection to the second mobile terminal based on a second transmission technology, wherein the second transmission technology is Wi-Fi hotspot communication technology.

In an implementation, when the mobile terminal in the implementation of the present disclosure is configured to execute the method for data transmission as illustrated in FIG. 5 or FIG. 6 of the present disclosure, the mobile terminal in the implementation of the present disclosure may be the second mobile terminal described in any one of the foregoing implementations. The processor 100 invokes the computer-readable program codes stored in the memory 300 to execute the follows: establishing a direct communication connection to a first mobile terminal; receiving first user data from the first mobile terminal through the direct communication connection established; detecting the transmission status of the first user data, during the transmission of the first user data; sending a download request to the network-side storage device based on a determination that the transmission status detected of the first user data is abnormal, wherein the download request includes user identifier of the second mobile terminal; receiving second user data from the network-side storage device, wherein the second user data is a part of the first user data that is not transmitted due to transmission abnormality.

In an implementation, the processor 100 invokes the computer-readable program codes stored in the memory 300 to further execute the follows: detecting the transmission status of the first user data during a predetermined time period, based on a determination that the transmission status detected in the first user data is abnormal; determining whether the transmission status is switched to a normal status; receiving the second user data from the first mobile terminal based on a determination that the transmission status is switched to a normal status; sending the download request to the network-side storage device based on a determination that the transmission status does not return to a normal status.

In an implementation, the processor 100 invokes the computer-readable program codes stored in the memory 300 to further execute the follows: receiving third user data from the network-side storage device, wherein the third user data includes other user data except for the second user data, which is not transmitted from the first mobile terminal to the second mobile terminal through the direct communication connection due to transmission interruption, and the third user data includes the user data which is to be transmitted from a third mobile terminal to the second mobile terminal.

The first mobile terminal is different from the third mobile terminal.

The present disclosure further relates to a non-transitory computer-readable storage medium. The non-transitory computer-readable storage medium stores computer program codes. The computer program codes are executed by the processor 100 to perform the method for data transmission as illustrated in any implementation of the present disclosure with reference to FIG. 3 to FIG. 6.

In an implementation of the present disclosure, a computer program product is provided. The computer program product includes a non-transitory computer-readable storage medium for storing computer program codes. The computer program codes are executed by the processor 100 to perform the method for data transmission as illustrated in any implementation of the present disclosure with reference to FIG. 3 to FIG. 6.

In the implementations of the present disclosure, during the data transmission from the first mobile terminal to the second mobile terminal through the direct communication connection established, when the data transmission is in an abnormal status, the network-side storage device may store a part of the first user data that is not transmitted from the first mobile terminal to the second mobile terminal due to transmission abnormality, and may send the part of the first user data to the second mobile terminal, thereby storing and further transferring the direct communication connection user data that is not transmitted due to transmission abnormality with the aid of the network-side storage device.

The present disclosure further relates to a server. The server includes a memory configured to store computer-readable program codes; a processor configured to execute the computer-readable program codes to perform the method for data transmission as illustrated in any implementation of the present disclosure with reference to FIG. 7 to FIG. 8.

Figure 16:
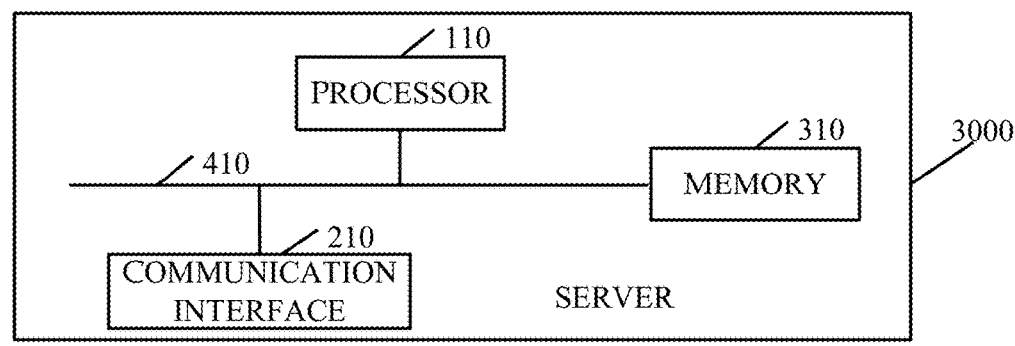
FIG. 16 is a structure diagram of a server according to an implementation of the present disclosure.

FIG. 16 is a structure diagram of a server 3000 in accordance with an implementation of the present disclosure, and the server 3000 is configured to execute the method for data transmission as illustrated in the implementation of the present disclosure with reference to FIG. 7 or FIG. 8. Specifically, as illustrated in FIG. 16, the server 3000 may include: at least one processor 110, at least one communication interface 210, a memory 310, and other components. These components are coupled and communicate with each other via one or more buses 410. Those skilled in the art should understand that, the structure of the server 3000 illustrated in FIG. 16 is not limit the implementation of the present disclosure. The structure can be a bus structure, can also be a star structure, and can include more or fewer components, or some components can be combined, or components can be arranged in a different way. Specific descriptions of the processor 110, the communication interface 210, the memory 310 may respectively refer to the related descriptions of the processor 100, the communication interface 200, the memory 300 as illustrated in the implementation of the present disclosure with reference to FIG. 15.

Specifically, when the server 3000 in the implementation of the present disclosure is configured to execute the method for data transmission as illustrated in FIG. 7 or FIG. 8 of the present disclosure, the processor 110 invokes the computer-readable program codes stored in the memory 310 to execute the follows: receiving a first storage request from a first mobile terminal, wherein the first storage request includes user identifier of a second mobile terminal and second user data, wherein a direct communication connection for transmitting first user data is established between the first mobile terminal and the second mobile terminal, and the second user data is a part of the first user data that is not transmitted to the second mobile terminal from the first mobile terminal through the direct communication connection due to transmission abnormality; associating and storing the user identifier of the second mobile terminal and the second user data; receiving a download request from the second mobile terminal, wherein the download request from the second mobile terminal includes the user identifier of the second mobile terminal; searching for user data associated with the user identifier of the second mobile terminal from data stored, according to the user identifier of the second mobile terminal included in the download request from the second mobile terminal; and sending the user data searched to the second mobile terminal.

In an implementation, the first storage request further includes data identifier of the second user data. The processor 110 invokes the computer-readable program codes stored in the memory 310 to further execute the follows: associating and storing the second user data and the data identifier of the second user data.

In an implementation, the download request from the second mobile terminal further includes the data identifier of the second user data, and the user data associated with the user identifier of the second mobile terminal includes the second user data. In the implementation, the processor 110 that may be configured to invoke the computer-readable program codes to perform the sending the user data searched to the second mobile terminal, is further configured to perform the flows: sending the second user data searched to the second mobile terminal, according to the data identifier of the second user data included in the download request from the second mobile terminal.

In an implementation, the processor 110 invokes the computer-readable program codes stored in the memory 310 to further execute the follows: receiving a second storage request from the first mobile terminal, wherein the second storage request includes third user data and the user identifier of the second mobile terminal, and the third user data is different from the second user data; and associating and storing the user identifier of the second mobile terminal and the third user data.

In an implementation, the user data associated with the user identifier of the second mobile terminal further includes the third user data. In the implementation, the processor 110 that may be configured to invoke the computer-readable program codes to perform the sending the user data searched to the second mobile terminal, is further configured to perform the flows: sending the third user data searched to the second mobile terminal.

In an implementation, the processor 110 invokes the computer-readable program codes stored in the memory 310 to further execute the follows: when the user identifier of a third mobile terminal and the data identifier of the third user data are received from the first mobile terminal, sending the third user data stored to the third mobile terminal, according to the data identifier of the third user data.

In an implementation, the processor 110 invokes the computer-readable program codes stored in the memory 310 to further execute at least one of: when the second mobile terminal has accessed to the network-side storage device, sending, to a second mobile terminal, a prompt message for inquiring whether to download data, according to the user identifier of the second mobile terminal included in at least one of the first storage request and the second storage request.

The prompt message to the second mobile terminal includes data identifier of user data to be download which is associated with the user identifier of the second mobile terminal.

The present disclosure further relates to a non-transitory computer-readable storage medium. The non-transitory computer-readable storage medium stores computer program codes. The computer program codes are executed by the processor 110 to perform the method for data transmission as illustrated in the implementation of the present disclosure with reference to FIG. 7 or FIG. 8.

In an implementation of the present disclosure, a computer program product is provided. The computer program product includes a non-transitory computer-readable storage medium for storing computer program codes. The computer program codes are executed by the processor 110 to perform the method for data transmission as illustrated in the implementation of the present disclosure with reference to FIG. 7 or FIG. 8.

In the implementations of the present disclosure, during the data transmission from the first mobile terminal to the second mobile terminal through the direct communication connection established, when the data transmission is in an abnormal status, the network-side storage device may store a part of the first user data that is not transmitted from the first mobile terminal to the second mobile terminal due to transmission abnormality, and may send the part of the first user data to the second mobile terminal, thereby storing and further transferring the direct communication connection user data that is not transmitted due to transmission abnormality with the aid of the network-side storage device.

In the foregoing implementations, descriptions of each implementation are emphasized respectively, and parts which are not elaborated in a certain implementation may subject to relevant descriptions of other implementations.

It should be understood that, the device and the method disclosed in implementations provided herein may be implemented in other ways. For example, the device implementations described above are merely illustrative, for instance, the division of the module is only a logical function division and there can be another way of division during actual implementations, for example, multiple modules or components may be combined or may be integrated into another system, or some features may be ignored or not performed. In addition, coupling or communication connection between each displayed or discussed component may be direct coupling or communication connection, or may be indirect coupling or communication among devices or modules via some interfaces, and may be electrical and mechanical or adopt other forms.

The modules described as separate components may or may not be physically separate, the components illustrated as modules may or may not be physical modules, and namely they may be in the same place or may be distributed to multiple network modules. Part or all of the modules may be selected per actual needs to achieve the purpose of the technical solutions of the implementations.

In addition, the functional modules in various implementations of the present disclosure may be integrated in one processing module, or each module may be physically present, or two or more modules may be integrated in one module. The above-mentioned integrated module may be implemented in the form of hardware, or in the form of hardware plus software function module.

The integrated modules implemented in the form of software functional modules described above may be stored in a computer-readable storage medium. The software function module is stored in a storage medium, and includes several instructions for causing a computer device (which may be a personal computer, a server, a network device and so on) or a processor to perform some steps of the method according to each implementation of the present disclosure. The foregoing storage medium includes various media capable of storing program codes, such as a USB disk, a mobile disk, a ROM, a RAM, a magnetic disk, or an optical disk and so on.

For convenience and simplicity of description, those skilled in the art may clearly understand that, only the division of the foregoing functional modules is used as an example. In practical applications, the above function allocation may be performed by different functional modules according to actual needs. That is, the internal structure of the device is divided into different functional modules to perform all or part of the functions described above. When the specific working processes of the above device are described, the corresponding processes of the above method implementations can be referred, which will not be repeated herein.

Finally, it should be noted that the foregoing implementations are merely provided for describing the technical solutions of the present disclosure, rather than limiting the present disclosure. Although the present disclosure has been described in detail with reference to the foregoing implementations, those skilled in the art should understand that: they may still make modifications to the technical solutions described in the foregoing implementations, or make equivalent replacements to part or all of the technical features in the technical solutions, and that such modifications or replacements do not make the essence of the corresponding technical solutions depart from the scope of the technical solutions of the implementations of the present disclosure.

What is claimed is:

1. A method for data transmission using a first mobile terminal as a sender, comprising:
    establishing a direct communication connection to a second mobile terminal used as a receiver;
    transmitting first user data to the second mobile terminal through the direct communication connection established;
    detecting a transmission status of the first user data during transmitting the first user data;
    accessing to a network-side storage device based on a determination that the transmission status detected is abnormal; and
    sending a first storage request to the network-side storage device to cause the network-side storage device to store second user data, wherein the first storage request comprises the second user data and a user identifier of the second mobile terminal, wherein the second user data is a part of the first user data that is not transmitted to the second mobile terminal due to the transmission status being detected as abnormal.

2. The method according to claim 1, wherein based on a determination that the transmission status detected is abnormal, the method further comprises:
    detecting the transmission status of the first user data during a predetermined time period;
    accessing to the network-side storage device, based on a determination that the transmission status of the first user data is still abnormal after the predetermined time period; and
    transmitting the second user data to the second mobile terminal through the direct communication connection established, when the transmission status of the first user data is switched to a normal status from an abnormal status within the predetermined time period.

3. The method according to claim 2, wherein accessing to the network-side storage device comprises:
    detecting whether the first mobile terminal is connected to a network;
    enabling a network connection function to connect the first mobile terminal to a network, based on a determination that the first mobile terminal is detected to be unconnected to the network;
    obtaining user information of a user of the first mobile terminal for network storage; and
    logging in to the network-side storage device according to the user information obtained, after the first mobile terminal is connected to the network.

4. The method according to claim 3, further comprising:
    after accessing to the network-side storage device, outputting a prompt message for inquiring whether to use the network-side storage device for data storage; and
    generating the first storage request when a response signal for storing data using the network-side storage device is received.

5. The method according to claim 1, further comprising:
    sending a second storage request to the network-side storage device, to ask the network-side storage device to transfer third user data to the second mobile terminal, wherein the second storage request comprises the third user data and the user identifier of the second mobile terminal, and the third user data is different from the second user data.

6. The method according to claim 5, wherein the second storage request further comprises a data identifier of the third user data, and the method further comprises:
    sending, to the network-side storage device, a user identifier of a third mobile terminal and the data identifier of the third user data, to ask the network-side storage device to transfer, according to the data identifier of the third user data, the third user data to the third mobile terminal.

7. The method according to claim 1, wherein establishing the direct communication connection to the second mobile terminal comprises at least one of:
    establishing a first direct communication connection to the second mobile terminal based on a first transmission technology, wherein the first transmission technology comprises at least one of Bluetooth, infrared, and Near Field Communication technology; and
    establishing a second direct communication connection to the second mobile terminal based on a second transmission technology, wherein the second transmission technology comprises a Wi-Fi hotspot communication technology.

8. The method according to claim 1, wherein establishing the direct communication connection to the second mobile terminal comprises:
    establishing a first direct communication connection to the second mobile terminal based on a first transmission technology, wherein the first transmission technology comprises at least one of Bluetooth, infrared, and Near Field Communication technology;
    exchanging connection data of a second transmission technology with the second mobile terminal through the first direct communication connection established; and
    establishing a second direct communication connection to the second mobile terminal based on the connection data and the second transmission technology, wherein the second transmission technology comprises a Wi-Fi hotspot communication technology, and the connection data comprises a user name and an access password of the Wi-Fi hotspot.

9. A mobile terminal that is used as a sender, comprising:
    a memory configured to store computer-readable program codes;
    a processor configured to invoke the computer-readable program codes to:
        establish a direct communication connection to a second mobile terminal that is used as a receiver;

transmit first user data to the second mobile terminal through the direct communication connection established;

detect a transmission status of the first user data during transmitting the first user data;

access to a network-side storage device based on a determination that the transmission status detected is abnormal; and send a first storage request to the network-side storage device, wherein the first storage request comprises second user data and a user identifier of the second mobile terminal, wherein the second user data is a part of the first user data that is not transmitted to the second mobile terminal due to the transmission status being detected as abnormal.

10. The mobile terminal according to claim 9, wherein the processor configured to invoke the computer-readable program codes to access to the network-side storage device is further configured to:

detect whether the mobile terminal is connected to a network;

enable a network connection function to connect the mobile terminal to a network based on a determination that the mobile terminal is unconnected to the network;

obtain user information of a user of the mobile terminal for network storage; and log in to the network-side storage device according to the user information obtained, after the mobile terminal is connected to the network.

11. The mobile terminal according to claim 10, wherein the processor is further configured to invoke the computer-readable program codes to:

after accessing to the network-side storage device, output a prompt message for inquiring whether to use the network-side storage device for data storage; and generate the first storage request when a response signal for storing data using the network-side storage device is received.

12. The mobile terminal according to claim 9, wherein the processor is further configured to invoke the computer-readable program codes to:

send a second storage request to the network-side storage device, to ask the network-side storage device to transfer third user data to the second mobile terminal, wherein the second storage request comprises the third user data and the user identifier of the second mobile terminal, and wherein the third user data is different from the second user data.

13. The mobile terminal according to claim 12, wherein the second storage request further comprises a data identifier of the third user data, and the processor is further configured to invoke the computer-readable program codes to:

send, to the network-side storage device, a user identifier of a third mobile terminal and the data identifier of the third user data, wherein the network-side storage device transfers, according to the data identifier of the third user data, the third user data to the third mobile terminal.

14. The mobile terminal according to claim 9, wherein the processor configured to invoke the computer-readable program codes to establish the direct communication connection to the second mobile terminal is further configured to:

establish a first direct communication connection to the second mobile terminal based on a first transmission technology, wherein the first transmission technology comprises at least one of Bluetooth, infrared, and Near Field Communication technology;

exchange connection data of a second transmission technology with the second mobile terminal through the first direct communication connection established; and establish a second direct communication connection to the second mobile terminal based on the connection data and the second transmission technology, wherein the second transmission technology comprises a Wi-Fi hotspot communication technology, and the connection data comprises a user name and an access password of the Wi-Fi hotspot.

\* \* \* \* \*